United States Patent [19]

Maroulis et al.

[11] Patent Number: 4,713,362

[45] Date of Patent: Dec. 15, 1987

[54] SELECTIVE ZEOLITIC ADSORBENT AND A METHOD FOR ACTIVATION THEREOF

[75] Inventors: Peter J. Maroulis, Allentown; Charles G. Coe, Macungie; Steven M. Kuznicki, Easton; Patrick J. Clark, Palmerton; David A. Roberts, Allentown, all of Pa.

[73] Assignee: Air Products and Chemicals, Inc., Allentown, Pa.

[21] Appl. No.: 866,531

[22] Filed: May 22, 1986

[51] Int. Cl.$^4$ .................... B01J 29/06; B01J 39/06
[52] U.S. Cl. ........................................................ 502/85
[58] Field of Search ................................. 502/79, 85

[56] References Cited

U.S. PATENT DOCUMENTS

| | | | |
|---|---|---|---|
| 3,239,471 | 3/1966 | Chin et al. | 502/79 |
| 3,374,056 | 3/1968 | Maher et al. | 502/80 |
| 3,391,075 | 7/1968 | Plank et al. | 502/79 |
| 4,536,485 | 8/1985 | Topp-Jorgensen | 502/79 |
| 4,544,378 | 10/1985 | Coe et al. | 55/68 |

FOREIGN PATENT DOCUMENTS 104962 4/1974 German Democratic Rep. .
223203 12/1984 Japan .

OTHER PUBLICATIONS

Andronikashvili et al, "Chromotographic Separation of Low-Boiling Inorganic and Hydrocarbon Gas Mixtures on Zeolites", *J. of Chromatography,* 292, (1984), pp. 3-8.

Andronikashvili, "The Use of Zeolites on Gas Chromatography", Zhurnal Vses. Khim., vol. 28, No. 1, pp. 96-100, 1983.

Brettell et al, "Cryogenic Techniques on Gas Chromatography", American Laboratory, Oct. 1985.

Gillis et al, "Selective Retention of Oxygen Using Chromatographic Columns Containing Metal Chelate Polymers", Anal. Chem., 1985, 57, pp. 1572-1577.

Pollock et al, "Gas Chromatographic Separation . . . " J. of Chromatographic Science, vol. 22, Aug. 84, pp. 343-347.

*Primary Examiner*—Carl F. Dees
*Attorney, Agent, or Firm*—Willard Jones, II; James C. Simmons; William F. Marsh

[57] ABSTRACT

A selective zeolitic adsorbent is prepared by activating a zeolitic composition having at least a portion, preferably at least 50%, of the exchangeable ion capacity occupied by a cation having a charge density of 2.0 or greater, preferably a divalent cation with a charge density of 2.0 or greater, such as calcium or magnesium by thoroughly dehydrating the exchanged zeolite. Additionally, separation ability of the zeolitic adsorbent can be further increased by reacting the thoroughly dehydrated zeolite in an oxidizing atmosphere.

26 Claims, 16 Drawing Figures

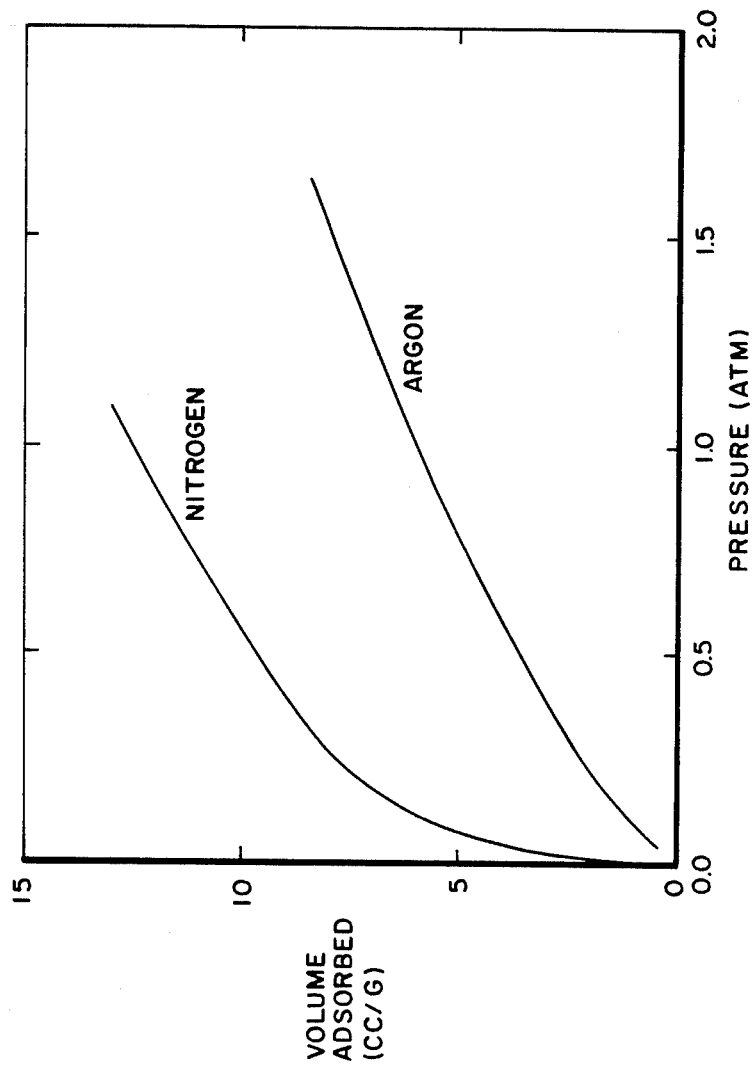

SELECTIVE ZEOLITIC ADSORBENT AND A METHOD FOR ACTIVATION THEREOF

TECHNICAL FIELD

The present invention is directed to a selective zeolitic adsorbent, a method of activation thereof, and the processes utilizing the selective adsorbent.

BACKGROUND OF THE PRIOR ART

Authors, T. G. Andronikashvili and G. V. Tsitsishvili, in *Journal of Chromatography*, 292, (1984), pages 3-8, show the use of synthetic zeolites of the X, Y and Z types, erionite and mordenite, as well as, natural zeolites, such as mordenite and clinoptilolite, for chromatographic separation of low-boiling inorganic and hydrocarbon gas mixtures. The zeolites referenced in the article were exchanged with $Li^+$, $K^+$, $Rb^+$, $Cs^+$, $Ag^+$, $Mg^{2+}$, $Ca^{2+}$, $Sr^+$, $Ba^{2+}$ and $Cd^{2+}$ and subsequently heated at 300° C. to 500° C. for four to several hours.

J de Zeeuw and R. C. M. de Niss in *Chrompack Topics*, 12, (1985), pages 1-4, show the use of fused silica PLOT Molecular Sieve 5A for separating permanent gases.

T. A. Bretell and R. L. Grob in *American Laboratory*, October, 1985, pages 19-32, disclose the separation of permanent gases using long column and/or subambient temperatures. Column lengths varied from 15 to 33 feet, and temperatures from ambient to −78° C. Two different materials were used for the separations, they are Molecular Sieve 5A and Chromosorb 102.

Another article by J. N. Gillis, R. E. Sievers and G. E. Pollock, *Analytical Chemistry*, 57, (1985), pages 1572 to 1577, teach the use of a metal chelate polymer column for separating argon and oxygen at ambient temperature from a 3 $\mu l$ sample of air. The limitations disclosed in the article are: it cannot perform argon/oxygen separations at temperatures above ambient, small sample volumes are used, high concentrations of components are separated with no mention of trace analysis and when oxygen is separated from the sample, argon and nitrogen coelute.

An article by G. E. Pollock, D. O'Hara and O. L. Hollis, in the *Journal of Chromatographic Science*, 22 (1984), pages 343-347, teaches the separation of permanent gases using divinyl-benzene, ethylene glycol dimethacrylate and combinations of the two polymers. To obtain baseline resolution of the two components in the sample, especially argon and nitrogen, long columns, in excess of 30 feet, were used at subambient temperatures ranging from 2° C. to 22° C. In addition, high concentration samples were used for the analysis and no mention was made concerning sample volume.

Japanese patent application No. 59,233,203 teaches the use of various cation forms of mordenite for separating argon from gaseous mixtures containing nitrogen; no details are given concerning the activation procedure.

German Pat. No. 104,962 discloses a process for separating argon from gaseous mixtures containing nitrogen and/or oxygen using various forms of mordenite. The patent teaches that argon in dry air can be separated from nitrogen and oxygen over a sodium mordenite adsorbent, however, the nitrogen and the oxygen coelute unseparated.

Although the prior art has taught numerous systems for the separation of permanent gases, these systems have been unable to separate oxygen from argon at ambient conditions. The present invention achieves these separations, even at mild conditions.

SUMMARY OF THE PRESENT INVENTION

The present invention relates to the activation of a zeolitic composition to produce a highly selective adsorbent and the uses for the adsorbent. Basically, the activation procedure requires that the base zeolite has at least a portion (preferably a minimum of 50% by weight) of the exchangeable ion capacity as a metal cation with a charge density of 2.0 or greater. These metal cations with a charge density of 2.0 or greater can be present because they are naturally occurring or because the original cations have been exchanged according to any of the established methods in the art. Once the zeolitic composition has these cations present in the structure, the zeolite must be thoroughly dehydrated. This dehydration is accomplished by heating the zeolitic material for a period of time at temperatures generally in excess of 400° C. in the presence of a non-reactive atmosphere. By non-reactive atmosphere, it is meant any gas or atmosphere that during heating of the zeolite to elevated temperatures will not cause alteration of the zeolite framework structure or the cations within the structure. By thorough dehydration, it is meant that the zeolite has a final water content less than 1.5% by weight, preferably 0.5% by weight. After the dehydration step has been completed, the zeolite can undergo an additional step for further increased separation ability. This additional treatment is carried out by heating the dehydrated zeolite in the presence of an oxidizing atmosphere at elevated temperatures.

The present invention contemplates combining the dehydration step and the oxidation step into a single operation.

BRIEF DESCRIPTION OF THE DRAWINGS

FIG. 16 is a diagram of the nitrogen and argon isotherms at 30° C. for Ca chabazite.

DETAILED DESCRIPTION OF THE INVENTION

Figure 1:
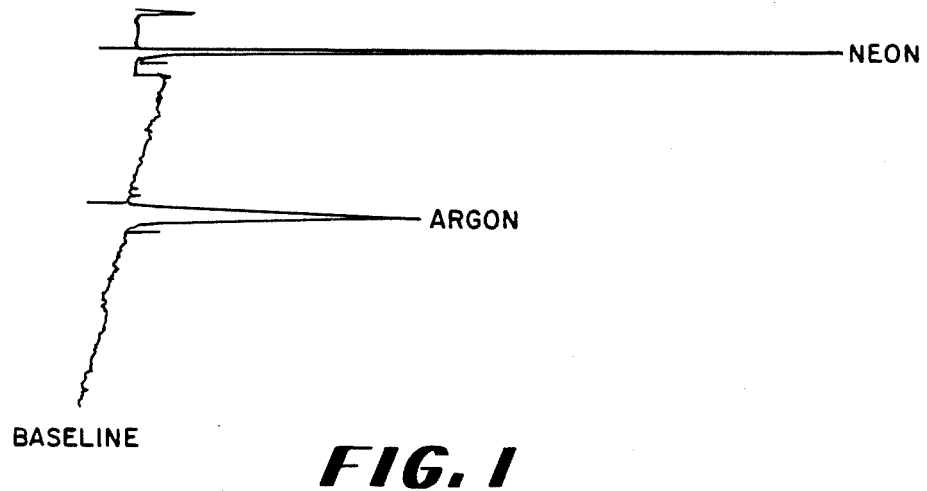
FIG. 1 is a chromatogram for the separation of argon and oxygen in Blend Gas #1 at 40° C. utilizing the adsorbent produced by the procedure in Example 2.

The phenomenon of selective adsorption by molecular sieve zeolites may arise from one of two properties inherent to these crystalline materials. The first property of a molecular sieve that give rise to selective adsorption is because of the extremely uniform porosity demonstrated by these crystalline aluminosilicates. The size or shape of one or more components of a mixture to be separated by selective adsorption may preclude its adsorption by the materials. The separation of n-paraffins from branched chain paraffins is an example of this effect. If a zeolite with a pore opening of ~5A is employed, the n-paraffin component of a mixture is readily adsorbed, but branched chain paraffins are excluded from adsorption by virtue of their configuration, effecting a separation of the components which is the basis of several commercial processes. If, however, the molecules of the mixture to be separated are all small enough to enter the zeolite crystals, selective adsorption may nonetheless be demonstrated by a second mechanism, cationic charge density. Charge density is defined as $Q/r^3$, where Q is the valence state of the cation and r is the crystal ionic radius in Angstroms.

Zeolites have large quantities of exchangeable ion capacity present within their aluminosilicate framework. Exchangeable ion capacity refers to the charge-compensating cations which are present within the zeolitic structure and that can be replaced by other cations in any proportion as long as the electric neutrality of the zeolitic structure is maintained. These cations are situated such that a high proportion may come into contact with adsorbates small enough to enter the crystalline zeolite framework. The energetic interaction of these cations with polar or polarizable adsorbates results in these adsorbates being selectively adsorbed from a mixture of less polar or polarizable species. This effect allows such separations as the selective adsorption of hydrogen from air as demonstrated by calcium exchanged A-type zeolite and sodium mordenite by pressure swing or vacuum swing adsorption processes. A comprehensive summary of the adsorptive properties of prior art molecular sieve zeolites, their causes and uses is found in D. W. Breck, *Zeolite Molecular Sieves*, J. Wiley and Sons, New York, Chapter 8, pages 593–724 (1974).

Since this second mechanism is dependent upon the charge density of the cations in the accessible portion of the zeolitic material, it follows that to tailor these zeolitic materials to be selective adsorbents either the best cations must be present in the proper positions in the material, such as may be found in manufactured or naturally occurring zeolites, or the cations in those positions must be exchanged with the proper cation. in general, for many of the materials used in this application, the starting material was cation exchanged according to the following generalized procedure. Basically, the starting material is ion exchanged in the presence of an excess of a water soluble salt, such as chloride, nitrate, sulfate and the like, of any polyvalent metal. The polyvalent metal can be of the divalent or trivalent transition elements of Groups 1 to 7b and Group 8 of the periodic table, the divalent alkaline earth metal elements of Group 2a and the lanthanide rare earth series. Preferably the polyvalent metal is selected from a group consisting of magnesium, calcium, strontium, barium and mixtures thereof. Still more preferably the polyvalent metal is calcium or magnesium or mixtures thereof. One example of a conventional ion exchange procedure is to repeatedly exchange the starting material with the polyvalent material in an aqueous solution at temperatures up to those at which reflux occurs, e.g. up to about 100° C. and about 1 atmosphere, for a period of 2 to 48 hours until a major portion of the original cations in the accessible portion of the starting material are replaced by polyvalent ions.

Once prepared with at least a major portion of the cationic content in the polyvalent state and washed substantially free of excess nonexchanged cations, the materials are ready for thermal activation.

Highly exchanged, thoroughly dehydrated polyvalent forms of zeolitic adsorbents, especially mordenite and chabazite, have much higher heats of adsorption for weakly interacting adsorbates than the corresponding monovalent forms. These higher heats lead to a significant increase in their ability to separate weakly adsorbing gases particularly at low partial pressures for a given set of process conditions. This separating ability is a direct consequence of the difference in the heats of adsorption for the adsorbates of interest and, this heat of adsorption is directly related to the charge density of the cation which is interacting with the adsorbate. Any water or other ligands interacting with these cations will lower its effective charge density and therefore decrease the heat of adsorption for weakly interacting adsorbates.

In order to achieve the maximum heat of adsorption for a given adsorbate, the zeolitic adsorbent must be thoroughly dehydrated. Therefore, the effect of thermal dehydration procedures on the adsorption properties of the polyvalent forms of several zeolitic adsorbents were studied. When compared to the sodium form, longer times and/or high temperatures are needed to fully dehydrate the polyvalent forms of the adsorbents, particularly, if they contain high charge density cations such as calcium or magnesium. When fully dehydrated, the charge balancing cations are left in a dehydrated/dehydroxylated state where they exhibit superior separating properties.

As set out above, the highly exchanged zeolitic adsorbent must be thoroughly dehydrated. Water, being quite polar, is strongly bound to cations having high charge density. It has long been recognized that these materials must be activated or dehydrated at elevated temperatures to remove water or other polar substances which would block adsorption. Dehydration of zeolitic adsorbents for gas adsorption generally means the residual water content in the adsorbent is less than 1.5% by weight water. However, previous zeolite surface scientists in the field of gas adsorption have failed to recognize that the conditions required to achieve this level of dehydration vary depending upon the nature of the charge-compensating cations. It is much more difficult to activate, for example, the polyvalent forms of chabazite compared to the sodium form of chabazite. Since the zeolites in the prior art were not thoroughly dehydrated, intrinsic thermodynamic properties associated with a thoroughly dehydrated zeolites were not observed nor was the ability to separate oxygen from argon observed. Thus, it is a key step of the present invention to thoroughly dehydrate the highly exchanged zeolite so that the water content is no greater than 1.5% by weight, preferably no greater than 0.5% by weight.

Surprisingly, it was found that when thoroughly dehydrated in the presence of a non-reactive atmosphere the polyvalent form of chabazite or other suitable zeolites having a charge density of about 2 or greater can effect the separation of oxygen from argon in a chromatographic column. By non-reactive atmosphere, it is meant any gas or atmosphere that during the heating of the zeolite to elevated temperatures will not cause alteration of the zeolite framework structure or the cations within the structure. Typical non-reactive atmospheres are helium, nitrogen, argon, hydrogen, carbon tetraflouride, other fluorinated hydrocarbons as are typically sold under the trademark of Freon, zero air and the like. It also follows from these findings that the same phenomenon is expected to occur with monovalent forms of zeolites wherein the monovalent cation has a charge density of 2 or greater, i.e. lithium. Additionally, the chabazite or other zeolites, e.g. mordenite, do not need be in the pure form, it is sufficient that the materials are chabazite-containing or zeolite-containing.

No reports of any chabazite displaying nitrogen heats of adsorption in the region of 10 kcal/mole have been found in the literature. Italian researchers disclose that calcium chabazite gives the highest nitrogen/oxygen selectivities, but do not mention or discuss the separation of argon from oxygen. (Nota diPaolo Ciambelli, Vincenzo DeSimone, et al, Rend Accad, Sci. Fis. Mat. Naples, Vol. 50 (1983), pp. 227–233). The data and experimental procedures presented suggest that the calcium chabazite was not thoroughly dehydrated and therefore would not have exhibited the separation of argon and oxygen or the high heat of adsorption for nitrogen.

Other workers used gas chromatography to study the influence of the cation on the adsorption properties and again showed a useful separation of oxygen from nitrogen but no mention of oxygen-argon separation. In both the above cases the chabazites were only dehydrated at 325°–350° C. for one hour. The present invention has shown this is not sufficient to thoroughly dehydrate the adsorbent.

It is believed that the oxygen/argon separation is a direct result of the electric field density surrounding these cations being sufficiently high to interact effectively with the small quadrapole of oxygen allowing it to be separated from argon. Oxygen, with its smaller quadrapole compared to nitrogen and concomitantly smaller degree of interaction with a given electrostatic energy field, is much less sensitive to the charge density of the cation present and requires very high fields to be selectively adsorbed from adsorbates having similar energetics but no quadrapole moment such as argon.

Another very important aspect of the present invention is the unexpected result that carrying out a secondary treatment on the dehydrated zeolitic adsorbents results in a further improvement and significantly expands the utility of these materials. With the treating of these adsorbents with an oxidizing gas at elevated temperatures, the detectability limits for analyzing oxygen in argon as well as other gases, are greatly expanded. The zeolitic adsorbents used as a chromatographic material after this secondary treatment in combination with a helium ionization detector could quantify ppb levels of gases including oxygen in the presence of argon.

This secondary treatment has led to a very practical way to analyze trace levels of gaseous impurities in gases used by various industries such as the semiconductor industry. In particular, Ca-chabazite can be used to separate oxygen from argon at trace levels at temperatures as high as 85° C. This has resulted in much shorter analysis times, as well as eliminating the need for subambient cooling used with Molecular Sieve 5A, the conventional packing material. Other previously difficult separations performed with the Ca-chabazite include trace analysis of oxygen in bulk hydrogen and nitrogen in bulk argon. A crystalline form of calcium chabazite has been used to separate trace oxygen ($\leqq 2.4$ ppm) from bulk argon and trace argon ($\leqq 5$ ppm) from bulk oxygen. Both of these separations have not been achieved with any commercially available material.

The use of this class of adsorbents subjected to the secondary treatment has been significantly expanded. Methods have been developed to analyze trace levels of neon, hydrogen, oxygen, nitrogen, methane, and carbon monoxide in bulk gases of helium, hydrogen, nitrogen, oxygen and argon.

It should be noted that the development of improved chromatographic materials to affect the analysis of oxygen in the presence of argon is an active area of research. Russian workers having reported several gas separations over a wide variety of cation exchanged zeolitic adsorbents (T. G. Andronikashvili and G. V. Tsitsishvili, Journal of *Chromatography*, 292, (1984), 3–8) however have not demonstrated an effective argon-oxygen separation.

A paper by J. de Zeeuw and R. C. M. de Niss, noted above describes the use of a 25 meter fused silica PLOT Molecular Sieve 5A column for separating permanent gases. The limitations to this material are small sample volume (<0.03 ml) resulting in poor detectable limits; long columns and small sample sizes needed for argon-oxygen baseline resolution; and no mention is made of the column's ability to handle low concentrations of permanent gases. The adsorbents of the present invention do not have these limitations.

R. L. Grob et al. (*American Laboratory*, (1985), pages 19–32) and many others have used very long columns, cryogenic temperatures, or preliminary removal of oxygen by catalysts to analyze oxygen in the presence of argon. Partial separation of argon from oxygen was demonstrated using combinations of NaA and Ca-X or Ca-A but these chromatograms were not baseline resolved and could only be carried out at temperatures of 0° C. or lower. (Melikashili Institutes of physical and Organic Chemistry, Academy of Sciences of the Georgian SSR. Translated from Zavodskaya Laboratoriya, Vol. 41, No. 4, pp. 398–401, April, 1975. Original article submitted July 6, 1973).

A complex multistep procedure for analyzing argon and nitrogen in oxygen has been reported but requires constant regeneration of a pretreatment column which scavenges the oxygen. (M. Verzele, M. Verstappe, and P. Sandra, Journal of Chromatography 209 (1981) 455–457). Custom-made porous polymers have been used as chromatographic packing but give very poor separation. (G. E. Pollock, D. O'Hara, and O. L. Hollis, Journal of Chromatographic Science, Vol. 22 (1984). Sievers et al (noted above) has shown the use of porous polymers containing metal complexes will separate oxygen from argon but the argon now coelutes with nitrogen and cannot be used to analyze argon in the presence of oxygen and nitrogen.

In contrast to all the prior art, using a column of fully dehydrated or fully dehydrated and oxidized calcium or magnesium chabazite as a chromatographic material provides a direct replacement in existing instrumentation and can be done easily. In addition, there exists no prior art or relevant references describing the analyses of ppb levels of oxygen in the presence of argon.

To demonstrate the effectiveness of the present invention both the dehydration of an adsorbent and the further improvements derived from the oxidation thereof, the following examples are provided. In these examples, the dehydration conditions and the oxidation conditions were modified to determine operating ranges. These modifications are in addition to changes in the base zeolite and the polyvalent exchange metal.

EXAMPLES

EXAMPLE 1

A 500 g sample of 1/16 inch pellets of chabazite (AW-500 obtained from Linde Division of Union Carbide) was exchanged with a one liter portion of 1M $CaCl_2$. The 1M $CaCl_2$ was added slowly to the zeolite contained in a two liter round-bottom flask equipped with a condenser. The solution was brought to reflux over a 30 minute period and held for an additional hour. The exchange solution was decanted and the pellets were washed three times with approximately two liter portions of distilled water. After the wash, a fresh one liter portion of 1M $CaCl_2$ was added to the zeolite pellets and the contents were brought to reflux. The exchange and wash procedures were repeated so as to have a total of four exchanges. After the final wash the zeolite was placed in a flat pan and air dried. Elemental analysis of the exchanged adsorbent indicated that 90% of the exchangeable cations were in the calcium form. The zeolite material was then ground to a 60/80 mesh and then placed into an 0.125 inch O.D.×0.085 inch I.D.×6 foot length of 304 stainless steel tubing.

EXAMPLE 2

A calcium exchanged chabazite zeolite, which was prepared by the procedure of Example 1, was subjected to a heat treatment during which helium gas was flowing over the chabazite. The conditions for the heat treating were as follows: the chabazite was gradually heated from 40° C. to 400° C. using a 3° C./min heating ramp, once the 400° C. temperature was achieved the material was heat soaked for an additional eight hours. The material was then allowed to cool to ambient temperature with the helium stream passing over the material. The flow rates of helium, measured at ambient temperature, were 185 ml/min at a column temperature of 40° C. and 67 ml/min at a column temperature of 400° C.; inlet helium pressure was 75 psig.

EXAMPLE 3

A calcium exchanged chabazite zeolite, which was prepared by the procedure of Example 1, was subjected to a heat treatment during which helium gas was flowing over the chabazite. The conditions for the heat treating were as follows: the chabazite was gradually heated from 40° C. to 400° C. using a 3° C./min heating ramp, once the 400° C. temperature was achieved the material was heat soaked for an additional eight hours. The material was then allowed to cool to ambient temperature with the helium stream passing over the material. The flow rates of helium, measured at ambient temperature, were 125 ml/min at a column temperature of 40° C. and 17 ml/min at a column temperature of 400° C.; inlet helium pressure was 38 psig.

EXAMPLE 4

A calcium exchanged chabazite zeolite, which was prepared by the procedure of Example 1, was subjected to a heat treatment during which helium gas was flowing over the chabazite. The conditions for the heat treating were as follows: the chabazite was gradually heated from 40° C. to 400° C. using a 3° C./min heating ramp, once the 400° C. temperature was achieved the material was heat soaked for an additional twenty four (24) hours. The material was then allowed to cool to ambient temperature with the helium stream passing over the material. The flow rates of helium, measured at ambient temperature, were 185 ml/min at a column temperature of 40° C. and 67 ml/min at a column temperature of 400° C.; inlet helium pressure was 75 psig.

EXAMPLE 5

A calcium exchanged chabazite zeolite, which was prepared by the procedure of Example 1, was subjected to a heat treatment during which helium gas was flowing over the chabazite. The conditions for the heat treating were as follows: the chabazite was gradually heated from 40° C. to 325° C. using a 3° C./min heating ramp, once the 325° C. temperature was achieved the material was heat soaked for an additional eight hours. The material was then allowed to cool to ambient temperature with the helium stream passing over the material. The flow rate of helium, measured at ambient temperature, was 67 ml/min at a column temperature of 325° C.; inlet helium pressure was 66 psig.

EXAMPLE 6

A calcium exchanged chabazite zeolite, which was prepared by the procedure of Example 1, was subjected to a heat treatment during which helium gas was flowing over the chabazite. The conditions for the heat treating were as follows: the chabazite was gradually heated from 40° C. to 250° C. using a 3° C./min heating ramp, once the 250° C. temperature was achieved the material was heat soaked for an additional eight hours. The material was then allowed to cool to ambient temperature with the helium stream passing over the material. The flow rate of helium, measured at ambient temperature, was 67 ml/min at a column temperature of 250° C.; inlet helium pressure was 62 psig.

EXAMPLE 7

A calcium exchanged chabazite zeolite, which was prepared by the procedure of Example 1, was subjected to a heat treatment during which helium gas was flowing over the chabazite. The conditions for the heat treating were as follows: the chabazite was gradually heated from 40° C. to 400° C. using a 12° C./min heating ramp, once the 400° C. temperature was achieved the material was heat soaked for an additional eight hours. The material was then allowed to cool to ambient temperature with the helium stream passing over the material. The flow rates of helium, measured at ambient temperature, were 185 ml/min at a column temperature of 40° C. and 67 ml/min at a column temperature of 400° C.; inlet helium pressure was 75 psig.

EXAMPLE 8

A calcium exchanged chabazite zeolite, which was prepared by the procedure of Example 1, was subjected to a heat treatment during which nitrogen gas was flowing over the chabazite. The conditions for the heat treating were as follows: the chabazite was gradually heated from 40° C. to 400° C. using a 3° C./min heating ramp, once the 400° C. temperature was achieved the material was heat soaked for an additional eight hours. The material was then allowed to cool to ambient temperature with the nitrogen stream passing over the material. The flow rates of nitrogen, measured at ambient temperature, were 185 ml/min at a column temperature of 40° C. and 67 ml/min at a column temperature of 400° C.; inlet nitrogen pressure was 75 psig.

EXAMPLE 9

A calcium exchanged chabazite zeolite, which was prepared by the procedure of Example 2, was subjected to an oxidation treatment. The oxidation treatment conditions were as follows: the material was gradually heated from 40° C. to 250° C. using a 10° C./min heating ramp, once the 250° C. temperature was achieved the oxidation was allowed to continue for another 1.5 hours. The oxidizing gas used in the treatment is zero air; zero air is a synthetic 79/21 volume percent mixture of nitrogen and oxygen, its $CO_2$ content is <1 ppm, $H_2O$ content is <2 ppm, and total hydrocarbon content is <0.1 ppm. The zero air flow rates, measured at ambient temperature, were 130 ml/min at a column temperature of 40° C. and 100 ml/min at a column temperature of 250° C.; inlet zero air pressure was 60 psig.

EXAMPLE 10

A calcium exchanged chabazite zeolite, which was prepared by the procedure of Example 2, was subjected to an oxidation treatment. The oxidation treatment conditions were as follows: the material was gradually heated from 40° C. to 250° C. using a 10° C./min heating ramp, once the 250° C. temperature was achieved the oxidation was allowed to continue for another eight hours. The oxidizing gas used in the treatment is zero air. The zero air flow rates, measured at ambient temperature, were 130 ml/min at a column temperature of 40° C. and 100 ml/min at a column temperature of 250° C.; inlet zero air pressure was 60 psig.

EXAMPLE 11

A calcium exchanged chabazite zeolite, which was prepared by the procedure of Example 2, was subjected to an oxidation treatment. The oxidation treatment conditions were as follows: the material was gradually heated from 40° C. to 100° C. using a 10° C./min heating ramp, once the 100° C. temperature was achieved the oxidation was allowed to continue for another 1.5 hours. The oxidizing gas used in the treatment is zero air. The zero air flow rate was 100 ml/min at a column temperature of 100° C.; inlet zero air pressure was 54 psig.

EXAMPLE 12

A calcium exchanged chabazite zeolite, which was prepared by the procedure of Example 2, was subjected to an oxidation treatment. The oxidation treatment conditions were as follows: the material was gradually heated from 40° C. to 250° C. using a 10° C./min heating ramp, once the 250° C. temperature was achieved the oxidation was allowed to continue for another 1.5 hours. The oxidizing gas used in the treatment is zero air. The zero air flow rates, measured at ambient temperature, were 60 ml/min at a column temperature of 40° C. and 20 ml/min at a column temperature of 250° C.; inlet zero air pressure was 38 psig.

EXAMPLE 13

A calcium exchanged chabazite zeolite, which was prepared by the procedure of Example 2, was subjected to an oxidation treatment. The oxidation treatment conditions were as follows: the material was gradually heated from 40° C. to 400° C. using a 10° C./min heating ramp, once the 400° C. temperature was achieved the oxidation was allowed to continue for another 1.5 hours. The oxidizing gas used in the treatment is zero air. The zero air flow rates, measured at ambient temperature, were 130 ml/min at a column temperature of 40° C. and 100 ml/min at a column temperature of 400° C.; inlet zero air pressure was 60 psig.

EXAMPLE 14

A calcium exchanged chabazite zeolite, which was prepared by the procedure of Example 2, was subjected to an oxidation treatment. The oxidation treatment conditions were as follows: the material was gradually heated from 40° C. to 250° C. using a 2° C./min heating ramp, once the 250° C. temperature was achieved the oxidation was allowed to continue for another 1.5 hours. The oxidizing gas used in the treatment is zero air. The zero air flow rates, measured at ambient temperature, were 130 ml/min at a column temperature of 40° C. and 100 ml/min at a column temperature of 250° C.; inlet zero air pressure was 60 psig.

EXAMPLE 15

A calcium exchanged chabazite zeolite, which was prepared by the procedure of Example 2, was subjected to an oxidation treatment. The oxidation treatment conditions were as follows: the material was gradually heated from 40° C. to 250° C. using a 10° C./min heating ramp, once the 250° C. temperature was achieved the oxidation was allowed to continue for another 1.5 hours. The oxidizing gas used in the treatment is $N_2O$. The $N_2O$ flow rates, measured at ambient temperature, were 130 ml/min at a column temperature of 40° C. and 100 ml/min at a column temperature of 250° C.; inlet $N_2O$ pressure was 60 psig.

EXAMPLE 16

A 500 g sample of 1/16 inch pellets of chabazite (AW-500 obtained from Linde) was exchanged with a one liter portion of 1M MgCl$_2$. The 1M MgCl$_2$ was added slowly to the zeolite contained in a two liter round-bottom flask equipped with a condenser. The solution was brought to reflux over a 30 minute period and held for an additional hour. The exchange solution was decanted and the pellets were washed three times with approximately two liter portions of distilled water. After the wash, a fresh one liter portion of 1M MgCl$_2$ was added to the zeolite pellets and the contents were brought to reflux. The exchange and wash procedures were repeated so as to have a total of four exchanges. To ensure a high degree of ion exchange, a fifth exchange was done for an eight hour period. After the final wash the zeolite was placed in a flat pan and air dried. Elemental analysis showed that 60% of the exchange capacity was in the magnesium form, 20% in the calcium form and 20% in the sodium form. The zeolite material was then ground to a 60/80 mesh and then placed into an 0.125 inch O.D.×0.085 inch I.D.×6 foot length of 304 stainless steel tubing.

EXAMPLE 17

A magnesium exchanged chabazite zeolite, which was prepared by the procedure of Example 16, was subjected to a heat treatment during which helium gas was flowing over the chabazite. The conditions for the heat treating were as follows: the chabazite was gradually heated from 40° C. to 400° C. using a 3° C./min heating ramp, once the 400° C. temperature was achieved the material was heat soaked for an additional eight hours. The material was then allowed to cool to ambient temperature with the helium stream passing over the material. The flow rates of helium, measured at ambient temperature, were 185 ml/min at a column temperature of 40° C. and 67 ml/min at a column temperature of 400° C.; inlet helium pressure was 75 psig.

EXAMPLE 18

A magnesium exchanged chabazite zeolite, which was prepared by the procedure of Example 17, was subjected to an oxidation treatment. The oxidation treatment conditions were as follows: the material was gradually heated from 40° C. to 250° C. using a 10° C./min heating ramp, once the 250° C. temperature was achieved the oxidation was allowed to continue for another 1.5 hours. The oxidizing gas used in the treatment is zero air. The zero air flow rates, measured at ambient temperature, were 130 ml/min at a column temperature of 40° C. and 100 ml/min at a column temperature of 250° C.; inlet zero air pressure was 60 psig.

EXAMPLE 19

A 500 g sample of 1/16 inch pellets of chabazite (AW-500 obtained from Linde) was exchanged with a one liter portion of 1M NiCl$_2$. The 1M NiCl$_2$ was added slowly to the zeolite contained in a two liter round-bottom flask equipped with a condenser. The solution was brought to reflux over a 30 minute period and held for an additional hour. The exchange solution was decanted and the pellets were washed three times with approximately two liter portions of distilled water. After the wash, a fresh one liter portion of 1M NiCl$_2$ was added to the zeolite pellets and the contents were brought to reflux. The exchange and wash procedures were repeated so as to have a total of four exchanges. After the final wash the zeolite was placed in a flat pan and air dried. Elemental analysis showed that 64% of the exchange capacity was nickel. The zeolite material was then ground to a 60/80 mesh and then placed into an 0.125 inch O.D.×0.085 inch I.D.×6 foot length of 304 stainless steel tubing.

EXAMPLE 20

A nickel exchanged chabazite zeolite, which was prepared by the procedure of Example 19, was subjected to a heat treatment during which helium gas was flowing over the chabazite. The conditions for the heat treating were as follows: the chabazite was gradually heated from 40° C. to 400° C. using a 3° C./min heating ramp, once the 400° C. temperature was achieved the material was heat soaked for an additional eight hours. The material was then allowed to cool to ambient temperature with the helium stream passing over the material. The flow rates of helium, measured at ambient temperature, were 185 ml/min at a column temperature of 40° C. and 67 ml/min at a column temperature of 400° C.; inlet helium pressure was 75 psig.

EXAMPLE 21

A nickel exchanged chabazite zeolite, which was prepared by the procedure of Example 20, was subjected to an oxidation treatment. The oxidation treatment conditions were as follows: the material was gradually heated from 40° C. to 250° C. using a 10° C./min heating ramp, once the 250° C. temperature was achieved the oxidation was allowed to continue for another 1.5 hours. The oxidizing gas used in the treatment is zero air. The zero air flow rates, measured at ambient temperature, were 130 ml/min at a column temperature of 40° C. and 100 ml/min at a column temperature of 250° C.; inlet zero air pressure was 60 psig.

EXAMPLE 22

A 500 g sample of 1/16 inch pellets of chabazite (AW-500 obtained from Linde) was exchanged with a one liter portion of 1M NaCl. The 1M NaCl was added slowly to the zeolite contained in a two liter round-bottom flask equipped with a condenser. The solution was brought to reflux over a 30 minute period and held for an additional hour. The exchange solution was decanted and the pellets were washed three times with approximately two liter portions of distilled water. After the wash, a fresh one liter portion of 1M NaCl was added to the zeolite pellets and the contents were brought to reflux. The exchange and wash procedures were repeated so as to have a total of four exchanges. After the final wash the zeolite was placed in a flat pan and air dried. Elemental analysis showed that 67% of the exchangeable ions were in the sodium form, 24% were in the calcium form, and 11% were in the magnesium form. The zeolite material was then ground to a 60/80 mesh and then placed into an 0.125 inch O.D.×0.085 inch I.D.×6 foot length of 304 stainless steel tubing.

EXAMPLE 23

A sodium exchanged chabazite zeolite, which was prepared by the procedure of Example 22, was subjected to a heat treatment during which helium gas was flowing over the chabazite. The conditions for the heat treating were as follows: the chabazite was gradually heated from 40° C. to 400° C. using a 3° C./min heating ramp, once the 400° C. temperature was achieved the material was heat soaked for an additional eight hours. The material was then allowed to cool to ambient temperature with the helium stream passing over the material. The flow rates of helium, measured at ambient temperature, were 185 ml/min at a column temperature of 40° C. and 67 ml/min at a column temperature of 400° C.; inlet helium pressure was 75 psig.

EXAMPLE 24

A sodium exchanged chabazite zeolite, which was prepared by the procedure of Example 23, was subjected to an oxidation treatment. The oxidation treatment conditions were as follows: the material was gradually heated from 40° C. to 250° C. using a 10° C./min heating ramp, once the 250° C. temperature was achieved the oxidation was allowed to continue for another 1.5 hours. The oxidizing gas used in the treatment is zero air. The zero air flow rates, measured at ambient temperature, were 130 ml/min at a column temperature of 40° C. and 100 ml/min at a column temperature of 250° C.; inlet zero air pressure was 60 psig.

EXAMPLE 25

An aluminum exchanged chabazite was prepared by exchanging the ammonium form of chabazite with an aqueous $Al(NO_3)_3$ solution. In the preparation, a 200 g portion of 1/16 inch pellets of ammonium chabazite was exchanged by adding 500 cc of 0.1M $Al(NO_3)_3$ solution to the zeolite, bringing the solution to reflux and maintaining the reflux for an hour. After cooling, the exchange solution was decanted, and the pellets were washed three times with approximately one liter portions of distilled water. After the wash, a fresh 500 cc portion of 0.1M $Al(NO_3)_3$ solution was added, and the above procedure was repeated. The procedure was repeated so that a total of four exchanges had taken place, however, in the last exchange, the reflux was continued for seven hours instead of one hour to assure thorough exchange. Elemental analysis indicates that approximately 60% of the exchangeable cations are aluminum species. The zeolite material was then ground to a 60/80 mesh and then placed into an 0.125 inch O.D.×0.085 inch I.D.×6 foot length of 304 stainless steel tubing.

EXAMPLE 26

An aluminum exchanged chabazite zeolite, which was prepared by the procedure of Example 25, was subjected to a heat treatment during which helium gas was flowing over the chabazite. The conditions for the heat treating were as follows: the chabazite was gradually heated from 40° C. to 400° C. using a 3° C./min heating ramp, once the 400° C. temperature was achieved the material was heat soaked for an additional eight hours. The material was then allowed to cool to ambient temperature with the helium stream passing over the material. The flow rates of helium, measured at ambient temperature, were 185 ml/min at a column temperature of 40° C. and 67 ml/min at a column temperature of 400° C.; inlet helium pressure was 75 psig.

EXAMPLE 27

An aluminum exchanged chabazite zeolite, which was prepared by the procedure of Example 26, was subjected to an oxidation treatment. The oxidation treatment conditions were as follows: the material was gradually heated from 40° C. to 250° C. using a 10° C./min heating ramp, once the 250° C. temperature was achieved the oxidation was allowed to continue for another 1.5 hours. The oxidizing gas used in the treatment is zero air. The zero air flow rates, measured at ambient temperature, were 130 ml/min at a column temperature of 40° C. and 100 ml/min at a column temperature of 250° C.; inlet zero air pressure was 60 psig.

EXAMPLE 28

A 500 g sample of 8-12 mesh beads of a 13X (NaX) zeolite, obtained from the Davison Division of W. R. Grace, was exchanged with a one liter portion of 1M $CaCl_2$. The 1M $CaCl_2$ was added slowly to the zeolite contained in a two liter round-bottom flask equipped with a condenser. The solution was brought to reflux over a 30 minute period and held for an additional hour. The exchange solution was decanted and the pellets were washed three times with approximately two liter portions of distilled water. After the wash, a fresh one liter portion of 1M $CaCl_2$ was added to the zeolite pellets and the contents were brought to reflux. The exchange and wash procedures were repeated so as to have a total of four exchanges. After the final wash the zeolite was placed in a flat pan and air dried. Elemental analysis indicated that 97% of the exchangeable cations were calcium. The zeolite material was then ground to a 60/80 mesh and then placed into an 0.125 inch O.D.×0.085 inch I.D.×6 foot length of 304 stainless steel tubing.

EXAMPLE 29

A calcium exchanged X zeolite, which was prepared by the procedure of Example 28, was subjected to a heat treatment during which helium gas was flowing over the chabazite. The conditions for the heat treating were as follows: the chabazite was gradually heated from 40° C. to 400° C. using a 3° C./min heating ramp, once the 400° C. temperature was achieved the material was heat soaked for an additional eight hours. The material was then allowed to cool to ambient temperature with the helium stream passing over the material. The flow rates of helium, measured at ambient temperature, were 185 ml/min at a column temperature of 40° C. and 67 ml/min at a column temperature of 400° C.; inlet helium pressure was 75 psig.

EXAMPLE 30

A calcium exchanged X zeolite, which was prepared by the procedure of Example 29, was subjected to an oxidation treatment. The oxidation treatment conditions were as follows: the material was gradually heated from 40° C. to 250° C. using a 10° C./min heating ramp, once the 250° C. temperature was achieved the oxidation was allowed to continue for another 1.5 hours. The oxidizing gas used in the treatment is zero air. The zero air flow rates, measured at ambient temperature, were 130 ml/min at a column temperature of 40° C. and 100 ml/min at a column temperature of 250° C.; inlet zero air pressure was 60 psig.

EXAMPLE 31

A 500 g sample of 1/16 inch pellets of a 4A (NaA) zeolite, obtained from Linde, was exchanged with a one liter portion of 1M $CaCl_2$. The 1M $CaCl_2$ was added slowly to the zeolite contained in a two liter round-bottom flask equipped with a condenser. The solution was brought to reflux over a 30 minute period and held for an additional hour. The exchange solution was decanted and the pellets were washed three times with approximately two liter portions of distilled water. After the wash, a fresh one liter portion of 1M $CaCl_2$ was added to the zeolite pellets and the contents were brought to reflux. The exchange and wash procedures were repeated so as to have a total of four exchanges. After the final wash the zeolite was placed in a flat pan and air dried. Elemental analysis showed that 99% of the exchangeable ion were in the calcium form. The zeolite material was then ground to a 60/80 mesh and then placed into an 0.125 inch O.D.×0.085 inch I.D.×6 foot length of 304 stainless steel tubing.

EXAMPLE 32

A calcium exchanged A zeolite, which was prepared by the procedure of Example 31, was subjected to a heat treatment during which helium gas was flowing over the chabazite. The conditions for the heat treating were as follows: the chabazite was gradually heated from 40° C. to 400° C. using a 3° C./min heating ramp. once the 400° C. temperature was achieved the material was heat soaked for an additional eight hours. The material was then allowed to cool to ambient temperature with the helium stream passing over the material. The flow rates of helium, measured at ambient temperature, were 185 ml/min at a column temperature of 40° C. and 67 ml/min at a column temperature of 400° C.; inlet helium pressure was 75 psig.

EXAMPLE 33

A calcium exchanged A zeolite, which was prepared by the procedure of Example 32, was subjected to an oxidation treatment. The oxidation treatment conditions were as follows: the material was gradually heated from 40° C. to 250° C. using a 10° C./min heating ramp, once the 250° C. temperature was achieved the oxidation was allowed to continue for another 1.5 hours. The oxidizing gas used in the treatment is zero air. The zero air flow rates, measured at ambient temperature, were 130 ml/min at a column temperature of 40° C. and 100 ml/min at a column temperature of 250° C.; inlet zero air pressure was 60 psig.

EXAMPLE 34

A calcium exchanged chabazite zeolite, which was prepared by the procedure of Example 1, was subjected to an oxidation treatment. The oxidation treatment conditions were as follows: the material was gradually heated from 40° C. to 400° C. using a 10° C./min heating ramp, once the 400° C. temperature was achieved the oxidation was allowed to continue for another eight hours. The oxidizing gas used in the treatment is zero air. The zero air flow rates, measured at ambient temperature, were 130 ml/min at a column temperature of 40° C. and 100 ml/min at a column temperature of 400° C.; inlet zero air pressure was 60 psig. The material did not undergo a heat treatment as described in Examples II through VIII.

EXAMPLE 35

Ion exchange procedures identical to those of Example 1 were carried out on a naturally occurring chabazite obtained from Durkee, Oreg. Elemental analysis of the exchanged chabazite indicated that 70% of the exchangeable cations were in the calcium form. The zeolite material was then ground to a 40/60 mesh and then placed into an 0.125 inch O.D.×0.085 inch I.D.×6 foot length of 304 stainless steel tubing.

EXAMPLE 36

A calcium exchanged chabazite, which was prepared by the procedure of Example 35, was subjected to a heat treatment during which helium gas was flowing over the chabazite. The conditions for the heat treating were as follows: the chabazite was gradually heated from 40° C. to 400° C. using a 3° C./min heating ramp, once the 400° C. temperature was achieved the material was heat soaked for an additional eight hours. The material was then allowed to cool to ambient temperature with the helium stream passing over the material. The flow rates of helium, measured at ambient temperature, were 185 ml/min at a column temperature of 40° C. and 67 ml/min at a column temperature of 400° C.; inlet helium pressure was 75 psig.

EXAMPLE 37

A calcium exchanged chabazite, which was prepared by the procedure of Example 36, was subjected to an oxidation treatment. The oxidation treatment conditions were as follows: the material was gradually heated from 40° C. to 250° C. using a 10° C./min heating ramp, once the 250° C. temperature was achieved the oxidation was allowed to continue for another 1.5 hours. The oxidizing gas used in the treatment is zero air. The zero air flow rates, measured at ambient temperature, were 130 ml/min at a column temperature of 40° C. and 100 ml/min at a column temperature of 250° C.; inlet zero air pressure was 60 psig.

EXAMPLE 38

A 500 g sample of 1/16 inch pellets of sodium mordenite, obtained from Norton Chemical, was exchanged twice with one liter portions of 2M $CaCl_2$. Each exchange lasted approximately 2 hours. Between the exchanges, the adsorbent was washed at least three times with distilled water. Following the second exchange, the adsorbent was washed three times with distilled water, placed in a flat pan, and dried. Elemental analysis showed that about 70% of the exchangeable ions were in the calcium form. The zeolite material was then ground to a 60/80 mesh and then placed into an 0.125 inch O.D.×0.085 inch I.D.×6 foot length of 304 stainless steel tubing.

EXAMPLE 39

A calcium exchanged mordenite, which was prepared by the procedure of Example 38, was subjected to a heat treatment during which helium gas was flowing over the mordenite. The conditions for the heat treating were as follows: the mordenite was gradually heated from 40° C. to 400° C. using a 3° C./min heating ramp, once the 400° C. temperature was achieved the material was heat soaked for an additional eight hours. The material was then allowed to cool to ambient temperature with the helium stream passing over the material. The flow rates of helium, measured at ambient temperature, were 185 ml/min at a column temperature of 40° C. and 67 ml/min at a column temperature of 400° C.; inlet helium pressure was 75 psig.

EXAMPLE 40

A calcium exchanged mordenite, which was prepared by the procedure of Example 39, was subjected to an oxidation treatment. The oxidation treatment conditions were as follows: the material was gradually heated from 40° C. to 250° C. using a 10° C./min heating ramp, once the 250° C. temperature was achieved the oxidation was allowed to continue for another 1.5 hours. The oxidizing gas used in the treatment is zero air. The zero air flow rates, measured at ambient temperature, were 130 ml/min at a column temperature of 40° C. and 100 ml/min at a column temperature of 250° C.; inlet zero air pressure was 60 psig.

EXAMPLE 41

A calcium exchanged mordenite, which was prepared by the procedure of Example 40, was subjected to an additional oxidation treatment. The oxidation treatment conditions were as follows: the material was gradually heated from 40° C. to 400° C. using a 10° C./min heating ramp, once the 400° C. temperature was achieved the oxidation was allowed to continue for another 16 hours. The oxidizing gas used in the treatment is zero air. The zero air flow rates, measured at ambient temperature, were 130 ml/min at a column temperature of 40° C.; inlet zero air pressure was 60 psig.

EXAMPLE 42

A calcium exchanged chabazite zeolite, which was prepared by the procedure of Example 1, was subjected to an oxidation treatment. The oxidation treatment conditions were as follows: the material was gradually heated from 40° C. to 400° C. using a 10° C./min heating ramp, once the 400° C. temperature was achieved the oxidation was allowed to continue for another 23 hours. The oxidizing gas used in the treatment is zero air. The zero air flow rates, measured at ambient temperature, were 130 ml/min at a column temperature of 40° C. and 100 ml/min at a column temperature of 400° C.; inlet zero air pressure was 60 psig. The material did not undergo a heat treatment as described in Examples 11 through VIII.

EXAMPLE 43

A calcium chabazite adsorbent prepared as described in Example 1 was packed into a 6 foot by ¼ inch stainless steel column and dehydrated according to the procedure in Example 4. The column was evaluated for analyses of percent levels of argon and oxygen using the following set of instrumental conditions:

```
Instrument: Perkin-Elmer 910, Autolab System IV-B Integrator
Integrator Parameters: 10PW, 20SS
Carrier Gas: Zero Grade Helium
Carrier Gas Flow Rate: 50 cc/min
Injection Temperature: 150° C.
Column Temperature: 48° C.
Thermal Conductivity Detector Current: 225 mA
Thermal Conductivity Detector Temperature: 150° C.
Ballast Pressure: 0.5 atm
Calibration Standards:   (1) 1.004% Argon in Helium
                         (2) 15.419% Argon in Helium
                         (3) UPC Grade Oxygen
                         (4) Room Air
                         (5) 0.1% Argon in Bulk Oxygen
```

Using the above conditions, the column separated argon and oxygen with sufficient resolution for good quantification. The argon response factors of the two standards indicated linearity of response over the the concentration range of 1 to 15 percent argon. Analysis of room air vs. the standards yielded results consistent with literature values, i.e. argon: 0.93% and oxygen: 20.81%. The analysis had a precision of ±0.5% relative standard deviation. The example shows that percentage levels of argon in oxygen can be quantitatively analyzed at above ambient temperatures.

The materials produced in Examples 2-15, 17-18, 20-21, 23-24, 26-27, 29-30, 32-34, 36-37, and 39-41 were tested with a gas chromatograph to determine if they could separate ppm concentrations of argon and oxygen at temperatures greater than ambient. Each material was evaluated for analyses of trace levels of argon and oxygen using an ultrasonic detector and the following set of instrumental conditions:

```
Instrument: Hewlett-Packard 5890
Carrier Gas: Research Grade Helium
Column Temperature: 40° C. and 70° C.
Corrected Flow Rate:  10.9 cc/min at 40° C.
                      11.7 cc/min at 70° C.
Detector Temperature: 100° C.
Sample Volume: 1.0 cc
```

To carry out this test two standard gas blends were used. Helium is the bulk gas component in each of the blends; an analysis of non-helium component gases in each of these two blends are as follow:

| | Standard Blend 1 | |
|---|---|---|
| Component | Concentration (vppm) | Concentration (ng/cc) |
| Neon | 11.1 | 9.2 |
| Argon | 2.2 | 3.6 |
| Oxygen | 1.7 | 2.2 |
| Hydrogen | 2.1 | 0.2 |
| Nitrogen | 4.0 | 4.6 |
| Methane | 2 4 | 1.6 |
| Carbon Monoxide | 3.5 | 4.0 |
| Carbon Dioxide | 4.1 | 7.4 |

| | Standard Blend 2 | |
|---|---|---|
| Component | Concentration (vppm) | Concentration (ng/cc) |
| Neon | 211 | 174 |
| Argon | 199 | 325 |
| Oxygen | 216 | 283 |

The gas chromatographic analyses were performed at 40° C. and 70° C. using a helium carrier gas. An ultrasonic detector was used to evaluate these materials. The two temperatures were chosen so that heats of adsorptions could be calculated for the samples. The chromatographic analyses of the above examples are listed in Table I. Table I details the retention time (RT), peak height (PH), and attenuation (Attn), in addition, the amount of dry zeolitic adsorbent material in the column is listed. An entry of ND on the table is indicative that oxygen was not detected by the analysis and hence no data were obtained.

TABLE I

| | Gas Blend #1 | | | | | | Gas Blend #2 | | | | | |
|---|---|---|---|---|---|---|---|---|---|---|---|---|
| | 40° C. Run | | | 70° C. Run | | | 40° C. Run | | | 70° C. Run | | |
| | RT | PH | Attn | RT | PH | Attn | RT | PH | Attn | RT | PH | Attn |
| | | | | | Example 2 | | | | | | | |
| | | | | (4.20 g - Ca Chabazite) | | | | | | | | |
| Neon | 0.68 | 118 | 4 | 0.68 | 98 | 4 | 0.69 | 149 | 32 | 0.66 | 145 | 32 |

TABLE I-continued

|  | Gas Blend #1 | | | | | | Gas Blend #2 | | | | | |
|---|---|---|---|---|---|---|---|---|---|---|---|---|
|  | 40° C. Run | | | 70° C. Run | | | 40° C. Run | | | 70° C. Run | | |
|  | RT | PH | Attn | RT | PH | Attn | RT | PH | Attn | RT | PH | Attn |
| Argon | 3.33 | 48 | 1 | 2.13 | 66 | 1 | 3.37 | 114 | 32 | 2.09 | 170 | 32 |
| Oxygen | ND | — | — | ND | — | — | 4.41 | 120 | 8 | 2.44 | 68 | 32 |

Example 3
(3.95 g - Ca Chabazite)

| Neon | 0.71 | 121 | 4 | 0.62 | 123 | 4 | 0.68 | 153 | 32 | 0.62 | 154 | 32 |
|---|---|---|---|---|---|---|---|---|---|---|---|---|
| Argon | 2.98 | 83 | 1 | 1.74 | 130 | 1 | 2.89 | 132 | 32 | 1.75 | 101 | 64 |
| Oxygen | ND | — | — | ND | — | — | 3.81 | 22 | 32 | 2.04 | 57 | 32 |

Example 4
(4.03 g - Ca Chabazite)

| Neon | 0.71 | 117 | 4 | 0.64 | 118 | 4 | 0.71 | 154 | 32 | 0.64 | 154 | 32 |
|---|---|---|---|---|---|---|---|---|---|---|---|---|
| Argon | 4.12 | 60 | 1 | 2.29 | 103 | 1 | 4.15 | 101 | 32 | 2.30 | 167 | 32 |
| Oxygen | ND | — | — | ND | — | — | 6.64 | 45 | 4 | 3.01 | 20 | 32 |

Example 5
(4.22 g - Ca Chabazite)

| Neon | 0.64 | 117 | 4 | 0.63 | 117 | 4 | 0.64 | 154 | 32 | 0.63 | 154 | 32 |
|---|---|---|---|---|---|---|---|---|---|---|---|---|
| Argon | 2.14 | 112 | 1 | 1.52 | 142 | 1 | 2.14 | 167 | 32 | 1.52 | 117 | 64 |
| Oxygen | ND | — | — | ND | — | — | 2.42 | 88 | 32 | 1.62 | 73 | 64 |

Example 6
(4.23 g - Ca Chabazite)

| Neon | 0.68 | 115 | 4 | 0.59 | 118 | 4 | 0.69 | 151 | 32 | 0.60 | 154 | 32 |
|---|---|---|---|---|---|---|---|---|---|---|---|---|
| Argon | — | — | — | — | — | — | 1.79 | — | — | 1.19 | — | — |
| Oxygen | ND | — | — | ND | — | — | 1.79 | — | — | 1.19 | — | — |

Example 7
(4.07 g - Ca Chabazite)

| Neon | 0.67 | 115 | 4 | 0.63 | 114 | 4 | 0.68 | 154 | 32 | 0.63 | 156 | 32 |
|---|---|---|---|---|---|---|---|---|---|---|---|---|
| Argon | 3.20 | 82 | 1 | 1.94 | 122 | 1 | 3.27 | 123 | 32 | 1.94 | 98 | 64 |
| Oxygen | ND | — | — | ND | — | — | 4.30 | 60 | 16 | 2.28 | 39 | 64 |

Example 8
(4.09 g - Ca Chabazite)

| Neon | 0.69 | 114 | 4 | 0.63 | 115 | 4 | 0.71 | 148 | 32 | 0.63 | 154 | 32 |
|---|---|---|---|---|---|---|---|---|---|---|---|---|
| Argon | 3.57 | 58 | 1 | 2.08 | 93 | 1 | 3.63 | 103 | 32 | 2.05 | 88 | 64 |
| Oxygen | ND | — | — | ND | — | — | 4.76 | 43 | 32 | 2.40 | 49 | 64 |

Example 9
(3.89 g - Ca Chabazite)

| Neon | 0.67 | 123 | 4 | 0.61 | 112 | 4 | 0.67 | 151 | 32 | 0.62 | 153 | 32 |
|---|---|---|---|---|---|---|---|---|---|---|---|---|
| Argon | 3.42 | 82 | 1 | 1.99 | 117 | 1 | 3.43 | 119 | 32 | 1.99 | 185 | 32 |
| Oxygen | 4.33 | 17 | 1 | 2.30 | 28 | 1 | 4.32 | 73 | 32 | 2.27 | 134 | 32 |

Example 10
(3.89 g - Ca Chabazite)

| Neon | 0.65 | 121 | 4 | 0.61 | 124 | 4 | 0.67 | 152 | 32 | 0.62 | 153 | 32 |
|---|---|---|---|---|---|---|---|---|---|---|---|---|
| Argon | 3.28 | 71 | 1 | 1.98 | 120 | 1 | 3.37 | 121 | 32 | 1.99 | 185 | 32 |
| Oxygen | 4.12 | 17 | 1 | 2.27 | 28 | 1 | 4.22 | 73 | 32 | 2.28 | 134 | 32 |

Example 11
(4.11 g - Ca Chabizite)

| Neon | 0.68 | 123 | 4 | 0.64 | 124 | 4 | 0.69 | 152 | 32 | 0.64 | 155 | 32 |
|---|---|---|---|---|---|---|---|---|---|---|---|---|
| Argon | 3.47 | 75 | 1 | 2.08 | 124 | 1 | 3.50 | 112 | 32 | 2.08 | 92 | 64 |
| Oxygen | ND | — | — | ND | — | — | 4.57 | 38 | 32 | 2.44 | 84 | 32 |

Example 12
(4.11 g - Ca Chabazite)

| Neon | 0.70 | 127 | 4 | 0.64 | 127 | 4 | 0.71 | 157 | 32 | 0.64 | 158 | 32 |
|---|---|---|---|---|---|---|---|---|---|---|---|---|
| Argon | 3.59 | 75 | 1 | 2.09 | 125 | 1 | 3.64 | 120 | 32 | 2.08 | 95 | 64 |
| Oxygen | 4.58 | 23 | 1 | 2.42 | 31 | 1 | 4.61 | 74 | 32 | 2.39 | 60 | 64 |

Example 13
(4.15 g - Ca Chabazite)

| Neon | 0.70 | 121 | 4 | 0.66 | 123 | 4 | 0.68 | 152 | 32 | 0.66 | 155 | 32 |
|---|---|---|---|---|---|---|---|---|---|---|---|---|
| Argon | 3.73 | 62 | 1 | 2.20 | 114 | 1 | 3.63 | 109 | 32 | 2.20 | 91 | 64 |
| Oxygen | 4.75 | 20 | 1 | 2.54 | 28 | 1 | 4.63 | 68 | 32 | 2.54 | 65 | 64 |

Example 14
(4.10 g - Ca Chabazite)

| Neon | 0.64 | 126 | 4 | 0.63 | 127 | 4 | 0.66 | 155 | 32 | 0.63 | 155 | 32 |
|---|---|---|---|---|---|---|---|---|---|---|---|---|
| Argon | 3.19 | 74 | 1 | 1.99 | 122 | 1 | 3.25 | 117 | 32 | 1.99 | 94 | 64 |
| Oxygen | 4.05 | 19 | 1 | 2.29 | 35 | 1 | 4.12 | 73 | 32 | 2.28 | 67 | 64 |

Example 15
(4.11 g - Ca Chabazite)

| Neon | 0.70 | 123 | 4 | 0.66 | 124 | 4 | 0.69 | 151 | 32 | 0.66 | 153 | 32 |
|---|---|---|---|---|---|---|---|---|---|---|---|---|
| Argon | 3.37 | 78 | 1 | 2.02 | 120 | 1 | 3.34 | 117 | 32 | 2.02 | 94 | 64 |
| Oxygen | 4.26 | 18 | 1 | 2.33 | 31 | 1 | 4.16 | 73 | 32 | 2.29 | 66 | 64 |

Example 17
(3.94 g - Mg Chabazite)

| Neon | 0.69 | 117 | 4 | 0.65 | 119 | 4 | 0.69 | 151 | 32 | 0.66 | 153 | 32 |
|---|---|---|---|---|---|---|---|---|---|---|---|---|
| Argon | 2.11 | 97 | 1 | 1.48 | 134 | 1 | 2.09 | 179 | 32 | 1.47 | 120 | 64 |
| Oxygen | ND | — | — | ND | — | — | 2.51 | 50 | 32 | 1.62 | 51 | 64 |

Example 18
(3.94 g - Mg Chabazite)

| Neon | 0.69 | 114 | 4 | — | — | — | 0.69 | 151 | 32 | — | — | — |
|---|---|---|---|---|---|---|---|---|---|---|---|---|

TABLE I-continued

|  | Gas Blend #1 | | | | | | Gas Blend #2 | | | | | |
|  | 40° C. Run | | | 70° C. Run | | | 40° C. Run | | | 70° C. Run | | |
|  | RT | PH | Attn | RT | PH | Attn | RT | PH | Attn | RT | PH | Attn |
|---|---|---|---|---|---|---|---|---|---|---|---|---|
| Argon | 2.12 | 126 | 1 | — | — | — | 2.12 | 177 | 32 | — | — | — |
| Oxygen | 2.46 | 37 | 1 | — | — | — | 2.42 | 120 | 32 | — | — | — |
| Example 20 (4.12 g - Ni Chabazite) | | | | | | | | | | | | |
| Neon | — | — | — | — | — | — | 0.68 | 154 | 32 | 0.62 | 157 | 32 |
| Argon | — | — | — | — | — | — | 1.86 | 100 | 64 | 1.30 | 130 | 64 |
| Oxygen | — | — | — | — | — | — | ND | — | — | ND | — | — |
| Example 21 (4.12 g - Ni Chabazite) | | | | | | | | | | | | |
| Neon | — | — | — | — | — | — | 0.64 | 77 | 64 | — | — | — |
| Argon | — | — | — | — | — | — | 1.76 | 96 | 64 | 1.35 | — | — |
| Oxygen | — | — | — | — | — | — | 1.88 | 70 | 64 | 1.35 | — | — |
| Example 23 (4.07 g - Na Chabazite) | | | | | | | | | | | | |
| Neon | — | — | — | — | — | — | 0.68 | 152 | 32 | 0.68 | 77 | 64 |
| Argon | — | — | — | — | — | — | 2.34 | 167 | 32 | 1.72 | 117 | 64 |
| Oxygen | — | — | — | — | — | — | ND | — | — | ND | — | — |
| Example 24 (4.07 g - Na Chabazite) | | | | | | | | | | | | |
| Neon | — | — | — | — | — | — | 0.66 | 77 | 64 | — | — | — |
| Argon | — | — | — | — | — | — | 2.30* | 112 | 64 | — | — | — |
| Oxygen | — | — | — | — | — | — | *Argon/Oxygen Combined | | | — | — | — |
| Example 26 (3.88 g - Al Chabazite) | | | | | | | | | | | | |
| Neon | — | — | — | — | — | — | 0.67 | 155 | 32 | 0.62 | 79 | 64 |
| Argon | — | — | — | — | — | — | 1.88* | 97 | 64 | 1.31* | 185 | 64 |
| Oxygen | — | — | — | — | — | — | *Argon/Oxygen Combined | | | *Argon/Oxygen Combined | | |
| Example 27 (3.88 g - Al Chabazite) | | | | | | | | | | | | |
| Neon | — | — | — | — | — | — | 0.67 | 78 | 64 | — | — | — |
| Argon | — | — | — | — | — | — | 1.82* | 148 | 64 | — | — | — |
| Oxygen | — | — | — | — | — | — | *Argon/Oxygen Combined | | | — | — | — |
| Example 29 (4.27 g - Ca X Zeolite) | | | | | | | | | | | | |
| Neon | — | — | — | — | — | — | 0.69 | 75 | 64 | 0.65 | 77 | 64 |
| Argon | — | — | — | — | — | — | 1.56 | 121 | 64 | 1.19 | 145 | 64 |
| Oxygen | — | — | — | — | — | — | 1.87 | 62 | 64 | 1.33 | 95 | 64 |
| Example 30 (4.27 g - Ca X Zeolite) | | | | | | | | | | | | |
| Neon | 0.71 | 116 | 4 | — | — | — | 0.70 | 75 | 64 | 0.64 | 77 | 64 |
| Argon | 1.60 | 180 | 4 | — | — | — | 1.58 | 122 | 64 | 1.18 | 145 | 64 |
| Oxygen | 1.87 | 24 | 4 | — | — | — | 1.84 | 85 | 64 | 1.29 | 110 | 64 |
| Example 32 (4.47 g - Ca A Zeolite) | | | | | | | | | | | | |
| Neon | 0.67 | 123 | 4 | — | — | — | 0.68 | 155 | 32 | — | — | — |
| Argon | 1.59 | 175 | 1 | — | — | — | 1.61 | 128 | 64 | — | — | — |
| Oxygen | — | — | — | — | — | — | 1.71 | 93 | 64 | — | — | — |
| Example 33 (4.47 g - Ca A Zeolite) | | | | | | | | | | | | |
| Neon | 0.66 | 123 | 4 | — | — | — | 0.67 | 153 | 32 | — | — | — |
| Argon | 1.56 | 94 | 2 | — | — | — | 1.58 | 124 | 64 | — | — | — |
| Oxygen | 1.65 | 33 | 2 | — | — | — | 1.66 | 101 | 64 | — | — | — |
| Example 34 (4.23 g - Ca Chabazite) | | | | | | | | | | | | |
| Neon | 0.66 | 127 | 4 | 0.64 | 130 | 4 | 0.67 | 153 | 32 | 0.62 | 153 | 32 |
| Argon | 3.41 | 89 | 1 | 2.10 | 67 | 2 | 3.53 | 114 | 32 | 2.02 | 90 | 64 |
| Oxygen | 4.30 | 28 | 1 | 2.41 | 23 | 2 | 4.32 | 72 | 32 | 2.31 | 66 | 64 |
| Example 36 (3.67 g - Ca Chabazite [Oregon]) | | | | | | | | | | | | |
| Neon | 0.73 | 123 | 4 | — | — | — | 0.72 | 151 | 32 | 0.67 | 152 | 32 |
| Argon | 2.43 | 33 | 1 | — | — | — | 2.39 | 160 | 32 | 1.63 | 109 | 64 |
| Oxygen | ND | — | — | — | — | — | 2.73 | 100 | 32 | 1.74 | 82 | 64 |
| Example 37 (3.67 g - Ca Chabazite [Oregon]) | | | | | | | | | | | | |
| Neon | 0.71 | 121 | 4 | — | — | — | 0.71 | 150 | 32 | — | — | — |
| Argon | 2.34 | 56 | 1 | — | — | — | 2.37 | 158 | 32 | — | — | — |
| Oxygen | 2.63 | 37 | 1 | — | — | — | 2.65 | 128 | 32 | — | — | — |
| Example 39 (4.39 g - Ca Mordinite) | | | | | | | | | | | | |
| Neon | — | — | — | — | — | — | 0.64 | 154 | 32 | 0.61 | 156 | 32 |
| Argon | — | — | — | — | — | — | 3.02 | 79 | 32 | 1.83 | 150 | 32 |
| Oxygen | — | — | — | — | — | — | ND | — | — | ND | — | — |
| Example 40 (4.39 g - Ca Mordinite) | | | | | | | | | | | | |
| Neon | — | — | — | — | — | — | 0.64 | 155 | 32 | — | — | — |

TABLE I-continued

| | Gas Blend #1 | | | | | | Gas Blend #2 | | | | | |
|---|---|---|---|---|---|---|---|---|---|---|---|---|
| | 40° C. Run | | | 70° C. Run | | | 40° C. Run | | | 70° C. Run | | |
| | RT | PH | Attn | RT | PH | Attn | RT | PH | Attn | RT | PH | Attn |
| Argon | — | — | — | — | — | — | 3.00 | 64 | 32 | — | — | — |
| Oxygen | — | — | — | — | — | — | 3.21 | 96 | 32 | — | — | — |
| | | | | | | Example 41 | | | | | | |
| | | | | | | (4.39 g - Ca Mordinite) | | | | | | |
| Neon | 0.62 | 138 | 4 | — | — | — | 0.61 | 157 | 32 | — | — | — |
| Argon | 3.38 | 40 | 1 | — | — | — | 3.36 | 69 | 32 | — | — | — |
| Oxygen | 3.72 | 22 | 1 | — | — | — | 3.69 | 80 | 32 | — | — | — |
| | | | | | | Example 42 | | | | | | |
| | | | | | | (4.38 g - Ca Chabazite) | | | | | | |
| Neon | 0.67 | 114 | 4 | 0.64 | 127 | 4 | 0.68 | 153 | 32 | 0.64 | 157 | 32 |
| Argon | 3.81 | 12 | 1 | 2.24 | 19 | 1 | 3.88 | 103 | 32 | 3.88 | 176 | 32 |
| Oxygen | 4.94 | 23 | 1 | 2.63 | 48 | 1 | 5.00 | 64 | 32 | 2.62 | 124 | 32 |

Retention time data at 40° C. and 70° C. were used to calculate the isosteric heat of adsorption ($\Delta H_{ads}$), as well as, argon/oxygen selectivity and Henry constants.

Resolution ($R_s$) was determined with the following equation:

$$R_s = \frac{2(RT_{oxy} - RT_{arg})}{W_{oxy} + W_{arg}}$$

where:
rt = retention time
W = peak width

Resolution gives an indication of the peak shape and the degree of skewness or asymmetry. Resolution is related to peak height, because for constant peak area, increases in peak height must be accompanied by decreased peak width.

Peak height is measured in millimeters using a scale because an integration does not always pick up peaks that result from low concentration components which approach the detection limit of the detector.

Attenuation (Attn) is the reduction or enlargement of the detector signal. For example, a peak obtained with an Attn=4 would be reduced by a factor of 8 if it was obtained with an Attn=32. When peak height is multiplied by the manually measured attenuation, all the heights can be compared on an equal basis.

From the data listed in Table I, resolution factors, adsorption Henry constants ($\kappa$), the argon/oxygen selectivity, and heats of adsorption were calculated for each of the above described examples. These calculations are listed in Table II.

TABLE II

| | Example 2 | | | |
|---|---|---|---|---|
| | Gas Blend #1 | | Gas Blend #2 | |
| | 40° C. Run | 70° C. Run | 40° C. Run | 70° C. |
| Argon/Oxygen Selectivity | — | — | 1.39 | 1.25 |
| Argon Henry Constant (mmol/g/atm) | 0.267 | 0.143 | 0.270 | 0.141 |
| Oxygen Henry Constant (mmol/g/atm) | — | — | 0.375 | 0.176 |
| Resolution Factor | — | — | 2.39 | 1.35 |
| | Argon | | Oxygen | |
| | Blend #1 | Blend #2 | Blend #1 | Blend #2 |
| Heat of Adsorption (kcal/mol) | −4.43 | −4.61 | — | −5.38 |

| | Example 3 | | | |
|---|---|---|---|---|
| | Gas Blend #1 | | Gas Blend #2 | |
| | 40° C. Run | 70° C. Run | 40° C. Run | 70° C. Run |
| Argon/Oxygen Selectivity | — | — | 1.41 | 1.25 |
| Argon Henry Constant (mmol/g/atm) | 0.243 | 0.118 | 0.237 | 0.119 |
| Oxygen Henry Constant (mmol/g/atm) | — | — | 0.335 | 0.149 |
| Resolution Factor | — | — | 1.94 | 1.32 |
| | Argon | | Oxygen | |
| | Blend #1 | Blend #2 | Blend #1 | Blend #2 |
| Heat of Adsorption (kcal/mol) | −5.17 | −4.91 | — | −5.76 |

| | Example 4 | | | |
|---|---|---|---|---|
| | Gas Blend #1 | | Gas Blend #2 | |
| | 40° C. Run | 70° C. Run | 40° C. Run | 70° C. Run |
| Argon/Oxygen Selectivity | — | — | 1.72 | 1.43 |
| Argon Henry Constant (mmol/g/atm) | 0.358 | 0.170 | 0.361 | 0.171 |
| Oxygen Henry Constant (mmol/g/atm) | — | — | 0.623 | 0.244 |
| Resolution Factor | — | — | 2.04 | 1.16 |
| | Argon | | Oxygen | |
| | Blend #1 | Blend #2 | Blend #1 | Blend #2 |
| Heat of Adsorption (kcal/mol) | −5.30 | −5.32 | — | −6.67 |

| | Example 5 | | | |
|---|---|---|---|---|
| | Gas Blend #1 | | Gas Blend #2 | |
| | 40° C. Run | 70° C. Run | 40° C. Run | 70° C. Run |
| Argon/Oxygen Selectivity | — | — | 1.19 | 1.11 |
| Argon Henry Constant (mmol/g/atm) | 0.150 | 0.0875 | 0.150 | 0.0875 |

TABLE II-continued

| | | | | |
|---|---|---|---|---|
| Oxygen Henry Constant (mmol/g/atm) | — | — | 0.179 | 0.0974 |
| Resolution Factor | — | — | 1.24 | 0.571 |

| | Argon | | Oxygen | |
|---|---|---|---|---|
| | Blend #1 | Blend #2 | Blend #1 | Blend #2 |
| Heat of Adsorption (kcal/mol) | −3.85 | −3.85 | — | −4.31 |

Example 6

| | Gas Blend #1 | | Gas Blend #2 | |
|---|---|---|---|---|
| | 40° C. Run | 70° C. Run | 40° C. Run | 70° C. Run |
| Argon/Oxygen Selectivity | — | — | 1.00 | 1.00 |
| Argon Henry Constant (mmol/g/atm) | 0.109 | 0.0589 | 0.126 | 0.0491 |
| Oxygen Henry Constant (mmol/g/atm) | — | — | 0.126 | 0.0491 |
| Resolution Factor | — | — | 0.00 | 0.00 |

| | Argon | | Oxygen | |
|---|---|---|---|---|
| | Blend #1 | Blend #2 | Blend #1 | Blend #2 |
| Heat of Adsorption (kcal/mol) | −4.39 | −4.57 | — | −4.57 |

Example 7

| | Gas Blend #1 | | Gas Blend #2 | |
|---|---|---|---|---|
| | 40° C. Run | 70° C. Run | 40° C. Run | 70° C. Run |
| Argon/Oxygen Selectivity | — | — | 1.40 | 1.25 |
| Argon Henry Constant (mmol/g/atm) | 0.263 | 0.136 | 0.269 | 0.134 |
| Oxygen Henry Constant (mmol/g/atm) | — | — | 0.376 | 0.168 |
| Resolution Factor | — | — | 2.79 | 1.62 |

| | Argon | | Oxygen | |
|---|---|---|---|---|
| | Blend #1 | Blend #2 | Blend #1 | Blend #2 |
| Heat of Adsorption (kcal/mol) | −4.82 | −4.99 | — | −5.73 |

Example 8

| | Gas Blend #1 | | Gas Blend #2 | |
|---|---|---|---|---|
| | 40° C. Run | 70° C. Run | 40° C. Run | 70° C. Run |
| Argon/Oxygen Selectivity | — | — | 1.39 | 1.25 |
| Argon Henry Constant (mmol/g/atm) | 0.298 | 0.147 | 0.302 | 0.144 |
| Oxygen Henry Constant (mmol/g/atm) | — | — | 0.419 | 0.180 |
| Resolution Factor | — | — | 2.69 | 1.75 |

| | Argon | | Oxygen | |
|---|---|---|---|---|
| | Blend #1 | Blend #2 | Blend #1 | Blend #2 |
| Heat of Adsorption (kcal/mol) | — | — | — | — |

Example 9

| | Gas Blend #1 | | Gas Blend #2 | |
|---|---|---|---|---|
| | 40° C. Run | 70° C. Run | 40° C. Run | 70° C. Run |
| Argon/Oxygen Selectivity | 1.33 | 1.22 | 1.32 | 1.20 |
| Argon Henry Constant (mmol/g/atm) | 0.299 | 0.147 | 0.322 | 0.147 |
| Oxygen Henry Constant (mmol/g/atm) | 0.398 | 0.180 | 0.426 | 0.177 |
| Resolution Factor | 2.94 | 1.55 | 2.70 | 1.51 |

| | Argon | | Oxygen | |
|---|---|---|---|---|
| | Blend #1 | Blend #2 | Blend #1 | Blend #2 |
| Heat of Adsorption (kcal/mol) | −5.05 | −5.07 | −5.64 | −5.75 |

Example 10

| | Gas Blend #1 | | Gas Blend #2 | |
|---|---|---|---|---|
| | 40° C. Run | 70° C. Run | 40° C. Run | 70° C. Run |
| Argon/Oxygen Selectivity | 1.32 | 1.21 | 1.32 | 1.21 |
| Argon Henry Constant (mmol/g/atm) | 0.286 | 0.146 | 0.293 | 0.146 |
| Oxygen Henry Constant (mmol/g/atm) | 0.378 | 0.177 | 0.386 | 0.177 |
| Resolution Factor | 2.71 | 1.45 | 2.74 | 1.32 |

| | Argon | | Oxygen | |
|---|---|---|---|---|
| | Blend #1 | Blend #2 | Blend #1 | Blend #2 |
| Heat of Adsorption (kcal/mol) | −4.78 | −4.96 | −5.39 | −5.54 |

Example 11

| | Gas Blend #1 | | Gas Blend #2 | |
|---|---|---|---|---|
| | 40° C. Run | 70° C. Run | 40° C. Run | 70° C. Run |
| Argon/Oxygen Selectivity | — | — | 1.38 | 1.26 |
| Argon Henry Constant (mmol/g/atm) | 0.287 | 0.145 | 0.289 | 0.145 |
| Oxygen Henry Constant (mmol/g/atm) | — | — | 0.400 | 0.182 |
| Resolution Factor | — | — | 3.01 | 1.60 |

| | Argon | | Oxygen | |
|---|---|---|---|---|
| | Blend #1 | Blend #2 | Blend #1 | Blend #2 |
| Heat of Adsorption (kcal/mol) | — | −4.90 | — | −5.60 |

Example 12

| | Gas Blend #1 | | Gas Blend #2 | |
|---|---|---|---|---|
| | 40° C. Run | 70° C. Run | 40° C. Run | 70° C. Run |
| Argon/Oxygen Selectivity | 1.37 | 1.23 | 1.33 | 1.22 |
| Argon Henry Constant (mmol/g/atm) | 0.292 | 0.146 | 0.301 | 0.145 |

TABLE II-continued

| | | | | |
|---|---|---|---|---|
| Oxygen Henry Constant (mmol/g/atm) | 0.400 | 0.180 | 0.402 | 0.177 |
| Resolution Factor | 2.68 | 1.35 | 2.59 | 1.40 |
| | Argon | | Oxygen | |
| | Blend #1 | Blend #2 | Blend #1 | Blend #2 |
| Heat of Adsorption (kcal/mol) | −5.05 | −5.19 | −5.68 | −5.84 |

Example 13

| | Gas Blend #1 | | Gas Blend #2 | |
|---|---|---|---|---|
| | 40° C. Run | 70° C. Run | 40° C. Run | 70° C. Run |
| Argon/Oxygen Selectivity | 1.34 | 1.22 | 1.34 | 1.22 |
| Argon Henry Constant (mmol/g/atm) | 0.309 | 0.154 | 0.301 | 0.154 |
| Oxygen Henry Constant (mmol/g/atm) | 0.413 | 0.188 | 0.403 | 0.188 |
| Resolution Factor | 2.72 | 1.48 | 2.56 | 1.48 |
| | Argon | | Oxygen | |
| | Blend #1 | Blend #2 | Blend #1 | Blend #2 |
| Heat of Adsorption (kcal/mol) | −4.96 | −4.76 | −5.60 | −5.42 |

Example 14

| | Gas Blend #1 | | Gas Blend #2 | |
|---|---|---|---|---|
| | 40° C. Run | 70° C. Run | 40° C. Run | 70° C. Run |
| Argon/Oxygen Selectivity | 1.34 | 1.22 | 1.34 | 1.21 |
| Argon Henry Constant (mmol/g/atm) | 0.262 | 0.138 | 0.267 | 0.138 |
| Oxygen Henry Constant (mmol/g/atm) | 0.352 | 0.168 | 0.357 | 0.167 |
| Resolution Factor | 2.57 | 1.43 | 2.64 | 1.32 |
| | Argon | | Oxygen | |
| | Blend #1 | Blend #2 | Blend #1 | Blend #2 |
| Heat of Adsorption (kcal/mol) | — | — | — | — |

Example 15

| | Gas Blend #1 | | Gas Blend #2 | |
|---|---|---|---|---|
| | 40° C. Run | 70° C. Run | 40° C. Run | 70° C. Run |
| Argon/Oxygen Selectivity | 1.33 | 1.23 | 1.31 | 1.20 |
| Argon Henry Constant (mmol/g/atm) | 0.275 | 0.137 | 0.273 | 0.137 |
| Oxygen Henry Constant (mmol/g/atm) | 0.367 | 0.169 | 0.357 | 0.165 |
| Resolution Factor | 2.54 | 1.55 | 2.34 | 1.38 |
| | Argon | | Oxygen | |
| | Blend #1 | Blend #2 | Blend #1 | Blend #2 |
| Heat of Adsorption (kcal/mol) | −4.94 | −4.89 | −5.53 | −5.52 |

Example 17

| | Gas Blend #1 | | Gas Blend #2 | |
|---|---|---|---|---|
| | 40° C. Run | 70° C. Run | 40° C. Run | 70° C. Run |
| Argon/Oxygen Selectivity | — | — | 1.31 | 1.19 |
| Argon Henry Constant (mmol/g/atm) | 0.153 | 0.087 | 0.150 | 0.082 |
| Oxygen Henry Constant (mmol/g/atm) | — | 0.196 | — | 0.098 |
| Resolution Factor | — | — | 1.56 | 0.811 |
| | Argon | | Oxygen | |
| | Blend #1 | Blend #2 | Blend #1 | Blend #2 |
| Heat of Adsorption (kcal/mol) | — | −4.30 | — | −4.92 |

Example 18

| | Gas Blend #1 | | Gas Blend #2 | |
|---|---|---|---|---|
| | 40° C. Run | 70° C. Run | 40° C. Run | 70° C. Run |
| Argon/Oxygen Selectivity | 1.24 | — | 1.21 | — |
| Argon Henry Constant (mmol/g/atm) | 0.154 | — | 0.154 | — |
| Oxygen Henry Constant (mmol/g/atm) | 0.190 | — | 0.186 | — |
| Resolution Factor | 1.55 | — | 1.04 | — |
| | Argon | | Oxygen | |
| | Blend #1 | Blend #2 | Blend #1 | Blend #2 |
| Heat of Adsorption (kcal/mol) | — | — | — | — |

Example 20

| | Gas Blend #1 | | Gas Blend #2 | |
|---|---|---|---|---|
| | 40° C. Run | 70° C. Run | 40° C. Run | 70° C. Run |
| Argon/Oxygen Selectivity | — | — | — | — |
| Argon Henry Constant (mmol/g/atm) | — | — | 0.121 | 0.0685 |
| Oxygen Henry Constant (mmol/g/atm) | — | — | — | — |
| Resolution Factor | — | — | — | — |
| | Argon | | Oxygen | |
| | Blend #1 | Blend #2 | Blend #1 | Blend #2 |
| Heat of Adsorption (kcal/mol) | — | −4.06 | — | — |

Example 21

| | Gas Blend #1 | | Gas Blend #2 | |
|---|---|---|---|---|
| | 40° C. Run | 70° C. Run | 40° C. Run | 70° C. Run |
| Argon/Oxygen Selectivity | — | — | 1.10 | 1.00 |
| Argon Henry Constant (mmol/g/atm) | — | — | 0.155 | 0.0715 |

TABLE II-continued

|  | Argon | | Oxygen | |
| --- | --- | --- | --- | --- |
|  | Blend #1 | Blend #2 | Blend #1 | Blend #2 |
| Oxygen Henry Constant (mmol/g/atm) | — | — | 0.127 | 0.0715 |
| Resolution Factor | — | — | 0.50 | 0.00 |
| Heat of Adsorption (kcal/mol) | — | −3.78 | — | −4.11 |

Example 23

|  | Gas Blend #1 | | Gas Blend #2 | |
| --- | --- | --- | --- | --- |
|  | 40° C. Run | 70° C. Run | 40° C. Run | 70° C. Run |
| Argon/Oxygen Selectivity | — | — | — | — |
| Argon Henry Constant (mmol/g/atm) | — | — | 0.173 | 0.106 |
| Oxygen Henry Constant (mmol/g/atm) | — | — | — | — |
| Resolution Factor | — | — | — | — |

|  | Argon | | Oxygen | |
| --- | --- | --- | --- | --- |
|  | Blend #1 | Blend #2 | Blend #1 | Blend #2 |
| Heat of Adsorption (kcal/mol) | — | −3.47 | — | — |

Example 24

|  | Gas Blend #1 | | Gas Blend #2 | |
| --- | --- | --- | --- | --- |
|  | 40° C. Run | 70° C. Run | 40° C. Run | 70° C. Run |
| Argon/Oxygen Selectivity | — | — | 1.00 | — |
| Argon Henry Constant (mmol/g/atm) | — | — | 0.171 | — |
| Oxygen Henry Constant (mmol/g/atm) | — | — | 0.171 | — |
| Resolution Factor | — | — | 0.00 | — |

|  | Argon | | Oxygen | |
| --- | --- | --- | --- | --- |
|  | Blend #1 | Blend #2 | Blend #1 | Blend #2 |
| Heat of Adsorption (kcal/mol) | — | — | — | — |

Example 26

|  | Gas Blend #1 | | Gas Blend #2 | |
| --- | --- | --- | --- | --- |
|  | 40° C. Run | 70° C. Run | 40° C. Run | 70° C. Run |
| Argon/Oxygen Selectivity | — | — | 1.00 | 1.00 |
| Argon Henry Constant (mmol/g/atm) | — | — | 0.132 | 0.0738 |
| Oxygen Henry Constant (mmol/g/atm) | — | — | 0.132 | 0.0738 |
| Resolution Factor | — | — | 0.00 | 0.00 |

|  | Argon | | Oxygen | |
| --- | --- | --- | --- | --- |
|  | Blend #1 | Blend #2 | Blend #1 | Blend #2 |
| Heat of Adsorption (kcal/mol) | — | −4.14 | — | −4.14 |

Example 27

|  | Gas Blend #1 | | Gas Blend #2 | |
| --- | --- | --- | --- | --- |
|  | 40° C. Run | 70° C. Run | 40° C. Run | 70° C. Run |
| Argon/Oxygen Selectivity | — | — | 1.00 | — |
| Argon Henry Constant (mmol/g/atm) | — | — | 0.125 | — |
| Oxygen Henry Constant (mmol/g/atm) | — | — | 0.125 | — |
| Resolution Factor | — | — | 0.080 | — |

|  | Argon | | Oxygen | |
| --- | --- | --- | --- | --- |
|  | Blend #1 | Blend #2 | Blend #1 | Blend #2 |
| Heat of Adsorption (kcal/mol) | — | — | — | — |

Example 29

|  | Gas Blend #1 | | Gas Blend #2 | |
| --- | --- | --- | --- | --- |
|  | 40° C. Run | 70° C. Run | 40° C. Run | 70° C. Run |
| Argon/Oxygen Selectivity | — | — | 1.36 | 1.26 |
| Argon Henry Constant (mmol/g/atm) | — | — | 0.0862 | 0.0525 |
| Oxygen Henry Constant (mmol/g/atm) | — | — | 0.117 | 0.066 |
| Resolution Factor | — | — | 1.82 | 0.800 |

|  | Argon | | Oxygen | |
| --- | --- | --- | --- | --- |
|  | Blend #1 | Blend #2 | Blend #1 | Blend #2 |
| Heat of Adsorption (kcal/mol) | — | −3.53 | — | −4.06 |

Example 30

|  | Gas Blend #1 | | Gas Blend #2 | |
| --- | --- | --- | --- | --- |
|  | 40° C. Run | 70° C. Run | 40° C. Run | 70° C. Run |
| Argon/Oxygen Selectivity | 1.30 | — | 1.30 | 1.20 |
| Argon Henry Constant (mmol/g/atm) | 0.088 | — | 0.0855 | 0.0525 |
| Oxygen Henry Constant (mmol/g/atm) | 0.115 | — | 0.111 | 0.0632 |
| Resolution Factor | 1.26 | — | 1.37 | 0.629 |

|  | Argon | | Oxygen | |
| --- | --- | --- | --- | --- |
|  | Blend #1 | Blend #2 | Blend #1 | Blend #2 |
| Heat of Adsorption (kcal/mol) | — | −3.61 | — | −4.14 |

Example 32

|  | Gas Blend #1 | | Gas Blend #2 | |
| --- | --- | --- | --- | --- |
|  | 40° C. Run | 70° C. Run | 40° C. Run | 70° C. Run |
| Argon/Oxygen Selectivity | — | — | 1.07 | — |
| Argon Henry Constant (mmol/g/atm) | 0.0871 | — | 0.0881 | — |

TABLE II-continued

| | | | | |
|---|---|---|---|---|
| Oxygen Henry Constant (mmol/g/atm) | — | — | 0.0975 | — |
| Resolution Factor | — | — | 0.571 | — |

| | Argon | | Oxygen | |
|---|---|---|---|---|
| | Blend #1 | Blend #2 | Blend #1 | Blend #2 |
| Heat of Adsorption (kcal/mol) | — | — | — | — |

Example 33

| | Gas Blend #1 | | Gas Blend #2 | |
|---|---|---|---|---|
| | 40° C. Run | 70° C. Run | 40° C. Run | 70° C. Run |
| Argon/Oxygen Selectivity | 1.10 | — | 1.09 | — |
| Argon Henry Constant (mmol/g/atm) | 0.0852 | — | 0.0862 | — |
| Oxygen Henry Constant (mmol/g/atm) | 0.0937 | — | 0.0937 | — |
| Resolution Factor | 0.600 | — | 0.552 | — |

| | Argon | | Oxygen | |
|---|---|---|---|---|
| | Blend #1 | Blend #2 | Blend #1 | Blend #2 |
| Heat of Adsorption (kcal/mol) | — | — | — | — |

Example 34

| | Gas Blend #1 | | Gas Blend #2 | |
|---|---|---|---|---|
| | 40° C. Run | 70° C. Run | 40° C. Run | 70° C. Run |
| Argon/Oxygen Selectivity | 1.32 | 1.21 | 1.32 | 1.21 |
| Argon Henry Constant (mmol/g/atm) | 0.275 | 0.143 | 0.276 | 0.137 |
| Oxygen Henry Constant (mmol/g/atm) | 0.364 | 0.174 | 0.365 | 0.166 |
| Resolution Factor | 2.78 | 1.32 | 2.58 | 1.35 |

| | Argon | | Oxygen | |
|---|---|---|---|---|
| | Blend #1 | Blend #2 | Blend #1 | Blend #2 |
| Heat of Adsorption (kcal/mol) | −4.64 | −4.97 | −5.27 | −5.62 |

Example 36

| | Gas Blend #1 | | Gas Blend #2 | |
|---|---|---|---|---|
| | 40° C. Run | 70° C. Run | 40° C. Run | 70° C. Run |
| Argon/Oxygen Selectivity | — | — | 1.20 | 1.11 |
| Argon Henry Constant (mmol/g/atm) | 0.196 | — | 0.193 | 0.109 |
| Oxygen Henry Constant (mmol/g/atm) | — | — | 0.232 | 0.121 |
| Resolution Factor | — | — | 1.24 | 0.56 |

| | Argon | | Oxygen | |
|---|---|---|---|---|
| | Blend #1 | Blend #2 | Blend #1 | Blend #2 |
| Heat of Adsorption (kcal/mol) | — | −4.08 | — | −4.63 |

Example 37

| | Gas Blend #1 | | Gas Blend #2 | |
|---|---|---|---|---|
| | 40° C. Run | 70° C. Run | 40° C. Run | 70° C. Run |
| Argon/Oxygen Selectivity | 1.18 | — | 1.17 | — |
| Argon Henry Constant (mmol/g/atm) | 0.188 | — | 0.191 | — |
| Oxygen Henry Constant (mmol/g/atm) | 0.221 | — | 0.224 | — |
| Resolution Factor | 1.23 | — | 1.12 | — |

| | Argon | | Oxygen | |
|---|---|---|---|---|
| | Blend #1 | Blend #2 | Blend #1 | Blend #2 |
| Heat of Adsorption (kcal/mol) | — | — | — | — |

Example 39

| | Gas Blend #1 | | Gas Blend #2 | |
|---|---|---|---|---|
| | 40° C. Run | 70° C. Run | 40° C. Run | 70° C. Run |
| Argon/Oxygen Selectivity | — | — | — | — |
| Argon Henry Constant (mmol/g/atm) | — | — | 0.229 | 0.115 |
| Oxygen Henry Constant (mmol/g/atm) | — | — | — | — |
| Resolution Factor | — | — | — | — |

| | Argon | | Oxygen | |
|---|---|---|---|---|
| | Blend #1 | Blend #2 | Blend #1 | Blend #2 |
| Heat of Adsorption (kcal/mol) | — | — | — | — |

Example 40

| | Gas Blend #1 | | Gas Blend #2 | |
|---|---|---|---|---|
| | 40° C. Run | 70° C. Run | 40° C. Run | 70° C. Run |
| Argon/Oxygen Selectivity | — | — | 1.09 | — |
| Argon Henry Constant (mmol/g/atm) | — | — | 0.228 | — |
| Oxygen Henry Constant (mmol/g/atm) | — | — | 0.248 | — |
| Resolution Factor | — | — | 0.442 | — |

| | Argon | | Oxygen | |
|---|---|---|---|---|
| | Blend #1 | Blend #2 | Blend #1 | Blend #2 |
| Heat of Adsorption (kcal/mol) | — | — | — | — |

Example 41

| | Gas Blend #1 | | Gas Blend #2 | |
|---|---|---|---|---|
| | 40° C. Run | 70° C. Run | 40° C. Run | 70° C. Run |
| Argon/Oxygen Selectivity | 1.12 | — | 1.12 | — |
| Argon Henry Constant (mmol/g/atm) | 0.266 | — | 0.265 | — |

TABLE II-continued

| | | | | |
|---|---|---|---|---|
| Oxygen Henry Constant (mmol/g/atm) | 0.299 | — | 0.297 | — |
| Resolution Factor | 0.725 | — | 0.782 | — |
| | Argon | | Oxygen | |
| | Blend #1 | Blend #2 | Blend #1 | Blend #2 |
| Heat of Adsorption (kcal/mol) | — | — | — | — |

| | Example 42 | | | |
|---|---|---|---|---|
| | Gas Blend #1 | | Gas Blend #2 | |
| | 40° C. Run | 70° C. Run | 40° C. Run | 70° C. Run |
| Argon/Oxygen Selectivity | 1.36 | 1.24 | 1.35 | 1.23 |
| Argon Henry Constant (mmol/g/atm) | 0.303 | 0.152 | 0.309 | 0.153 |
| Oxygen Henry Constant (mmol/g/atm) | 0.413 | 0.189 | 0.417 | 0.188 |
| Resolution Factor | 3.05 | 1.77 | 2.91 | 1.57 |
| | Argon | | Oxygen | |
| | Blend #1 | Blend #2 | Blend #1 | Blend #2 |
| Heat of Adsorption (kcal/mol) | −4.94 | −5.03 | −5.57 | −5.69 |

The gas chromatography procedure used to evaluate the compositions of these examples for selectivity and indications of gas capacity trends is well accepted and similar to that used by several workers; see for example, J. R. Conder and C. L. Young, "Physiocochemical Measurement by Gas Chromatography", John-Wiley (1979); R. J. Neddenriep, *J. Coloid Interface Science*, 28, 293(1968); and A. V. Kiselev and Y. I. Yashin, *Gas-Adsorption Chromatography*, Plenum Press (1969), pp. 120–125. The samples were thermally activated according to the procedure listed under each example number. Inert gas retention volumes for each column were determined using 10% neon in helium. The gas chromatography method was limited to the low pressure region of the isotherm and represents a limiting value for the selectivities that might be approached in the adsorption of gaseous mixtures at zero coverage. Nevertheless, the method is rapid and valuable for screening and ranking adsorbent performance and is reproducible to within 10%.

The retention volume of an injected species into the adsorbent is the product of the retention time and the corrected flow rate. Thus one can calculate the retention volume, $V_I$, of inert species (from neon retention data), and the retention volume, $V_j$, of the jth adsorbate at different temperatures.

The adsorption Henry constant for the jth adsorbate can be calculated from the following equation:

$$\kappa_j = (V_j - V_I)/W_s$$

$\kappa$ has the unit cc/gm or moles/gm/moles/cc. $\kappa$ is the initial slope of an adsorption isotherm in which the quantity on the ordinate has the units of moles/gm and the abcissa has the units of moles/cc. Using ideal gas law as follows, $\kappa$ can be converted to the initial slope $C_1$ of the isotherm in which the quantity on the abcissa is the partial pressure of the adsorbate in units of pressure. Isotherms from gravimetrics or volumetric data are usually of the form:

$$C_1 = \kappa/RT_{column}$$

where R is the gas constant and T is the gas chromatograph temperature in °K.

Multiplication of $C_1$ by the molecular weight of the adsorbate gives the quantity $C_2$ which has units of gm(adsorbate)/g(adsorbent)/atm.

The selectivity ratio of species 2 over species 1, $\alpha_1^2$, is defined as:

$$\alpha_1^2 = n_{1(ads)}n_{2(gas)}/n_{2(ads)}n_{1(gas)}$$

where $n_{j(ads)}$ is the number of moles in the adsorbed phase and $n_{j(gas)}$ is the number of moles in the gas phase.

The selectivity ratio of, for example, oxygen and argon separation is calculated from:

$$\alpha = \kappa_{oxygen}/\kappa_{argon}$$

The heat of adsorptions were calculated using the standard equation, see G. W. Castellan, *Physical Chemistry*, Addison-Wesley Publishing Company, 1964 and H. Purnell, *Gas Chromatography*, John Wiley & Sons, 1962:

$$\partial \ln V_s/\partial T = \Delta H_{ads}/RT^2$$

where:
$\Delta H_{ads}$ = heat of adsorption
T = temperature
R = gas constant
$V_s$ = specific retention volume This equation can be expanded to allow direct calculation of $\Delta H_{ads}$ using data obtained from different temperatures:

$$\Delta H_{ads} = -1.987 T_1 T_2 \ln[\xi]$$

where
$\xi = ([RT]_i - [RT]_n)_1 f_1^o T_2 / ([RT]_i - [RT]_n)_2 f_2^o T_1$
T = temperature
[RT] = retention time
$f^o$ = corrected flow rate Table I gives the retention times for all the examples listed in the application. The ND entry for oxygen means that it was not detected. The most important result to note in Table I is that for the lowest concentration gas blend the oxygen-argon separation could only be observed after the adsorbents received the oxidation treatment. For example, compare Example 2 to Examples 9 or 10 and Examples 17 to 18. Also, note that in each case treating the dehydrated zeolitic adsorbent with zero air improves the resolution of the peaks and allows the separation of ppb levels of argon and oxygen.

Table II presents the thermodynamic properties of the zeolitic adsorbents prepared by the methods described in the above examples. These values, which are derived using standard procedures from the data in Table I, give the intrinsic properties of the material. In particular, the selectivity is only dependent on the temperature and is sometimes referred to as a separation factor. This factor in combination with the resolution factor (i.e., peak shape) will dictate whether or not two components are baseline resolved.

The following discussion of the gas chromatographic results will demonstrate the influence of operational parameters and adsorbent materials on the argon/oxygen separation using the two gas blends described above and the results listed in Tables I and II.

As stated previously, the adsorbents must be thoroughly dehydrated before one can effect a separation of argon and oxygen. Examples 2 to 8 show the effect of changing the process parameters used to dehydrate calcium chabazite. Comparison of the results in Table I, Example 2 to Example 3 shows that lowering the flow rate during dehydration of chabazite does not substantially effect the chromatography. Increasing the period of dehydration at 400° C. from 8 to 24 hours significantly increases the retention times and improves the separation factor, compare Examples 2 and 4.

Comparison of the results in Table I for Example 2 compared to Examples 5 and 6 shows the large negative effect on the chromatography if the dehydration temperature is decreased. Adsorbents dehydrated at 325° C. are not sufficiently dehydrated to affect oxygen-argon separation and dehydration at 250° C. is totally ineffective. The lower $\Delta H$ (ads) values show that the oxygen is not interacting as strongly with the adsorbent.

Comparing the gas chromatography results for Example 7 to Example 2 shows that increasing the rate of temperature increase up to the final dehydration temperature from 3° C./min up to 12° C./min does not influence the results. Example 8 used dry nitrogen instead of helium and illustrates that other dry nonreactive purge gases can be used to dehydrate the adsorbents.

To determine the operating range of parameters for dehydrating these materials, the following conditions were examined:

| Parameter | Conditions |
|---|---|
| Time: hr | 8, 24 |
| Temperature: °C. | 250, 325, 400 |
| Flow Rate: ml/min | 17, 67 at 400° C. column temperature |
| Temperature Ramp: °C./min | 3, 12 |
| Purge Gases | Helium, Nitrogen, and Zero Air |

Criteria used for evaluating these conditioning parameters were resolution of the argon and oxygen peaks and detectability of oxygen in Blend 2. Based on these experiments, reasonable conditioning parameters are:

| Parameter | Range |
|---|---|
| Time: hr | 8 to 72 |
| Temperature: °C. | 400+ |
| Flow Rate: ml/min | 2-200 at 400° C. column temperature |
| Temperature Ramp: °C./min | 0.5 to 25 |

Following the dehydration of the exchanged zeolitic composition, the material is then subjected to an oxidizing atmosphere at elevated temperatures. This oxidation step increases the separation ability of the zeolite, especially for the separation of argon and oxygen. To determine the operating range of parameters for oxidizing these zeolitic materials, the following conditions were examined:

| Parameter | Conditions |
|---|---|
| Time (hr) | 1.5, 8 |
| Temperature (°C.) | 100, 250, 400 |
| Flow Rate (ml/min) | 20 at 250° C., 100 at 250° C. |
| Temperature Range (°C./min) | 2, 10 |
| Oxidants | Air, $N_2O$ |

Criteria used for evaluating these conditioning parameters were resolution of the argon and oxygen peaks and detectability of oxygen in Blend 1. Example 9 resulted in the highest calculated $R_s$ factor and separated the oxygen in Blend 1. Examples 10-15, with the exception of 11, also gave excellent $R_s$ factors and separated 2.2 ng of oxygen. The range of calculated $R_s$ factors fall close to the experimental error of the experiment. Hence, examples 9-10 and 12-15 fall within the limits of the tested experimental parameter. Example 11 shows that at 100° C., 2.2 ng of oxygen were not detected. Based on these experiments, preferred conditioning parameters are:

| Parameter | Range |
|---|---|
| Time (hr) | 0.5 to 72 |
| Temperature (°C.) | 150 to 500 |
| Flow Rate (ml/min) | 5 at 250° C. to 200 at 250° C. |
| Temperature Ramp Rate (°C./min) | 0.5 to 25 |

Examples 9 and 15 show that zero air and nitrous oxide can be used to properly condition the Ca-chabazite for $Ar/O_2$ separation and low concentration $O_2$ detectability.

After the adsorbents are treated with air at 250° C., a variety of divalent exchanged forms can separate trace levels of oxygen from argon as seen from the gas chromatographic results for Examples 18 and 21. This is not the case prior to the oxidation treatment, compare Examples 17 and 20 to 18 and 21. It should also be noted that the monovalent sodium form of chabazite was ineffective after both the dehydration and oxidation treatment.

Additionally, it should be noted that the aluminum form of chabazite was also ineffective after both the dehydration and oxidation treatment. It is not known whether the aluminum cations present in the chabazite were in the dehydrated/dehydroxylated state. The aqueous chemistry of aluminum is complex and different aluminum containing oxides and hydroxides are present depending on the pH, therefore, depending upon the pH of the exchange of the zeolite, many different aluminum forms could be present. The procedure in Example 25 was a single attempt at preparing an example of a trivalent ion possessing a high charge density, i.e. aluminum, and during this attempt, no control of the pH was made. Since the chemistry is complex and since during the one attempt no control of pH was made, it should not be concluded from the gas chromatographic results for Examples 26 and 27, which use an aluminum chabazite adsorbent, that a trivalent form of chabazite or, in fact, any zeolite cannot be prepared where the trivalent cations will be present in the dehydrated/dehydroxylated state.

The results for examples 36 and 37 show that chabazites from other deposits work well and suggest that any adsorbent containing a chabazite phase when treated according to the conditions of this invention should separate oxygen from argon.

To demonstrate the generality of this invention, the calcium form of several other zeolitic adsorbents were evaluated. After the oxidation treatment they all could effect at least a partial separation of oxygen from argon. Examples 29, 30, 32, 33, etc. show that other zeolites in the polyvalent ion, more specifically, the divalent form, are effective.

The gas chromatographic results for the material prepared according to Example 34 shows that zero air can be used as both a purge and reactive gas to bring about the simultaneous dehydration and oxidation of the adsorbents of the invention thus simplifying the activation procedure without any reduction in the adsorbent's separating ability.

Referring to Table II and the thermodynamic values given therein, it is interesting to note that in every case treating a calcium-chabazite adsorbent with air results in a slight decrease in the heat of adsorption argon/oxygen selectivity and the Henry constant. For instance, compare examples 4 to 9 or 17 and 18. This suggests that the intrinsic adsorption properties are lowered slightly by the oxidation treatment however the sharpness of the oxygen peak is improved allowing baseline resolution of the two components and detection of these components at trace levels. These results suggest that the enhanced argon-oxygen separation in the gas chromatograph is a consequence of a subtle change in the geometric constraints of the adsorbent which improves the resolution (sharpness) of the GC peak for oxygen.

Air treatment at 400° C. without prior inert gas heating was evaluated. Examples 34 and 42 clearly illustrate the fact that this single step activation works as well as prior inert gas heat treatment. Air treatment at 400° C. for 23 hours showed slightly better resolution, especially at the 70° C. analysis, than the 8-hour treatment. This experiment also clearly shows that the inert gas does not work for reducing oxygen peak tailing or resolving oxygen at concentrations of 2.2 ng and lower.

As for other bulk gases, air treated Ca-chabazite has also been used with a helium ionization detector (HID) to analyze hydrogen, argon, oxygen, nitrogen, methane and carbon monoxide to low pg (ppbv) concentrations. The lower-limits-of-detection (LLD) which have been achieved with these methods is a function of both the column material prepared by the process of this invention to separate pg quantities of difficult to separate gases and the detector having the sensitivity to detect them Tables III-VII list the LLD values obtained using Ca-chabazite in combination with a gas chromatograph equipped with an HID dectector using chromatographic conditions similar to those described earlier. This system has been developed for analyzing the six gases listed above in gas matrices of helium, hydrogen, argon, nitrogen and oxygen.

TABLE III

| Trace Gas | Helium Matrix | |
|---|---|---|
| | LLD (PPB) | LLD (Pg) |
| Hydrogen | 25 | 2.1 |
| Argon | 10 | 16 |
| Oxygen | 8 | 10 |
| Nitrogen | 3 | 3 |
| Methane | 2 | 1 |
| Carbon Monoxide | 20 | 23 |

TABLE IV

| Trace Gas | Hydrogen Matrix | |
|---|---|---|
| | LLD (PPB) | LLD (Pg) |
| Argon | <50 | <80 |
| Oxygen | 20 | 26 |
| Nitrogen | 40 | 92 |
| Methane | 2 | 3 |
| Carbon Monoxide | 5 | 11 |

TABLE V

| Trace Gas | Nitrogen Matrix | |
|---|---|---|
| | LLD (PPB) | LLD (Pg) |
| Hydrogen | 15 | 1.2 |
| Argon | <50 | <80 |
| Oxygen | 7 | 9 |
| Methane | 10 | 5 |
| Carbon Monoxide | 25 | 29 |

TABLE VI

| Trace Gas | Argon Matrix | |
|---|---|---|
| | LLD (PPB) | LLD (Pg) |
| Oxygen | <2.4 PPM | <3100 |
| Nitrogen | 40 | 46 |
| Methane | 10 | 7 |
| Carbon Monoxide | 25 | 29 |

TABLE VII

| Trace Gas | Oxygen Matrix | |
|---|---|---|
| | LLD (PPB) | LLD (Pg) |
| Argon | 5 | 16 |
| Krypton | 5 | 17 |
| Nitrogen | 35 | 40 |
| Methane | 6 | 8 |
| Carbon Monoxide | 7 | 16 |

Air treated Ca-chabazite has been demonstrated to be an excellent adsorbent for separating a wide concentration range (to ng levels) of argon and oxygen in bulk He at elevated temperatures with short columns, e.g., six feet. Similarly, other trace gases, such as hydrogen, nitrogen, methane and carbon monoxide in He have been separated and analyzed with Ca-chabazite chromatographic packing materials. Trace nitrogen, methane and carbon monoxide have been resolved on a 1.5 foot Ca-chabazite column.

To illustrate the ability of an adsorbent, prepared by the method of the present invention, for gas chromatographic separation of argon and oxygen, the following graphic comparisons are offered.

Figure 2:
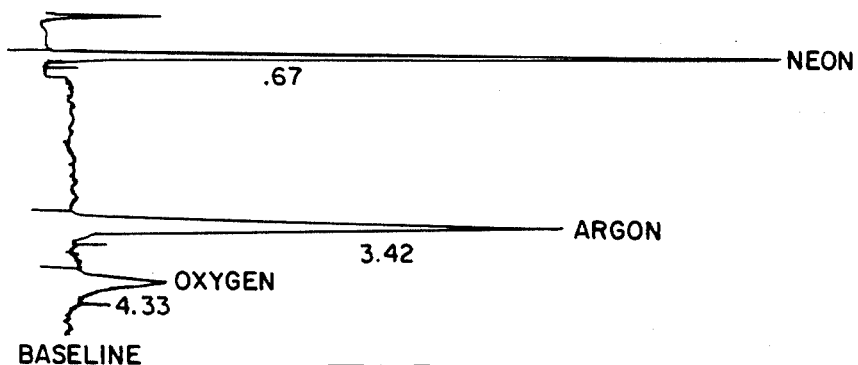
FIG. 2 is a chromatogram for the separation of argon and oxygen in Blend Gas #1 at 40° C. utilizing the adsorbent produced by the procedure in Example 9.

FIGS. 1 and 2 demonstrate the criticality of the oxidation step of the present invention for the activation of a metal exchanged zeolite for the separation of argon and oxygen. FIG. 1 is the graphic output of a chromatograph separating Gas Blend #1 at 40° C. utilizing the adsorbent prepared in Example 2. FIG. 2, which shows the graphic output of a chromatograph separating Gas Blend #1 utilizing the adsorbent prepared in Example 9, demonstrates that the use of the oxidation step allows for the separation of argon and oxygen. This separation is evident by the presence of an oxygen peak on FIG. 2 and the lack of an oxygen peak on FIG. 1. The base zeolite for both examples is calcium exchanged chabazite.

Figure 3:
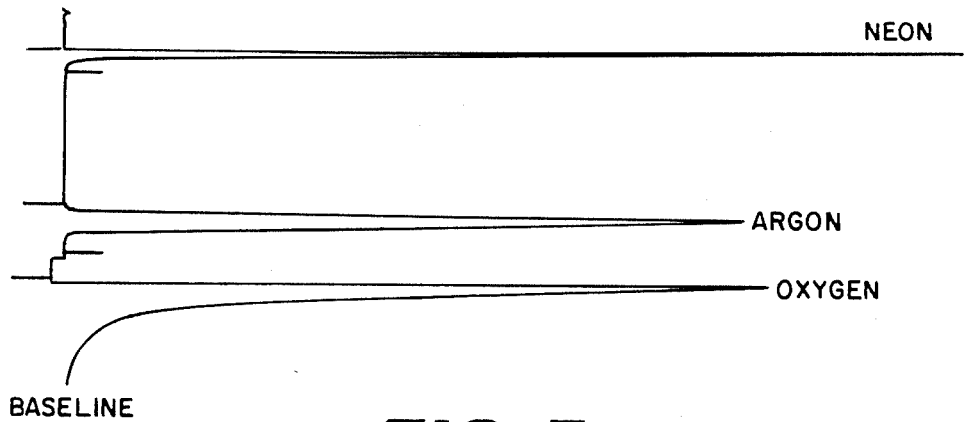
FIG. 3 is a chromatogram for the separation of argon and oxygen in Blend Gas #2 at 40° C. utilizing the adsorbent produced by the procedure in Example 2.
Figure 4:
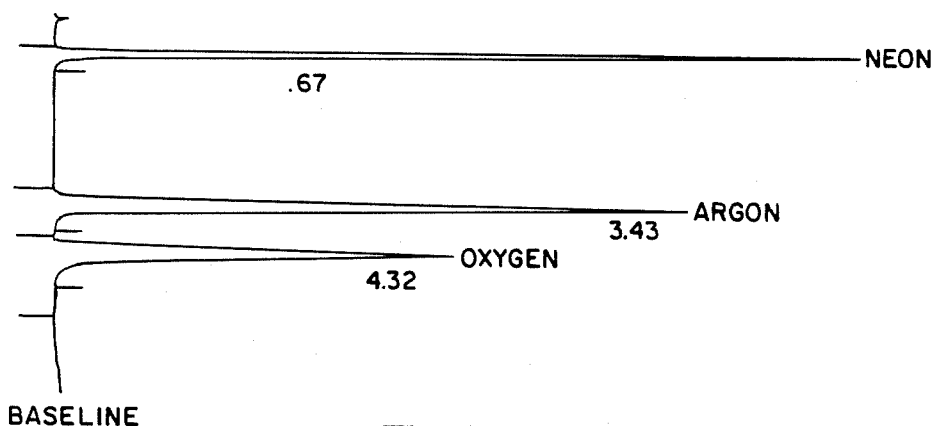
FIG. 4 is a chromatogram for the separation of argon and oxygen in Blend Gas #2 at 40° C. utilizing the adsorbent produced by the procedure in Example 9.

FIGS. 3 and 4 provide a comparison for Blend Gas #2 utilizing the adsorbent prepared by Example 2 and 9, respectively. As can be seen from the figures a result similar to that achieved in FIGS. 1 and 2 is present.

Figure 5:
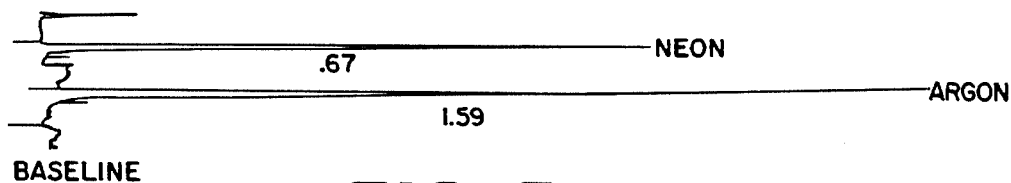
FIG. 5 is a chromatogram for the separation of argon and oxygen in Blend Gas #1 at 40° C. utilizing the adsorbent produced by the procedure in Example 32.
Figure 6:
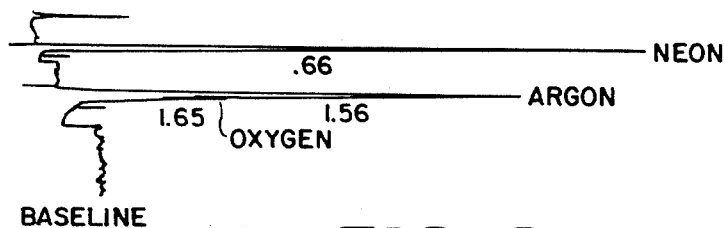
FIG. 6 is a chromatogram for the separation of argon and oxygen in Blend Gas #1 at 40° C. utilizing the adsorbent produced by the procedure in Example 33.

FIGS. 5 and 6 provide a comparison similar to that of FIGS. 1 and 2, however, in these figures, the adsorbent in the column is prepared by the procedure of Example 32 and 33, respectively, i.e. the base zeolite of both examples is a calcium exchanged A zeolite.

Figure 7:
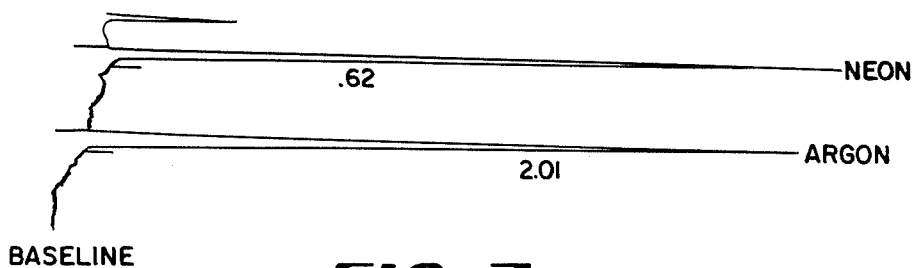
FIG. 7 is a chromatogram for the separation of argon and oxygen in Blend Gas #1 at 70° C. utilizing the adsorbent produced by the procedure in Example 2.
Figure 8:
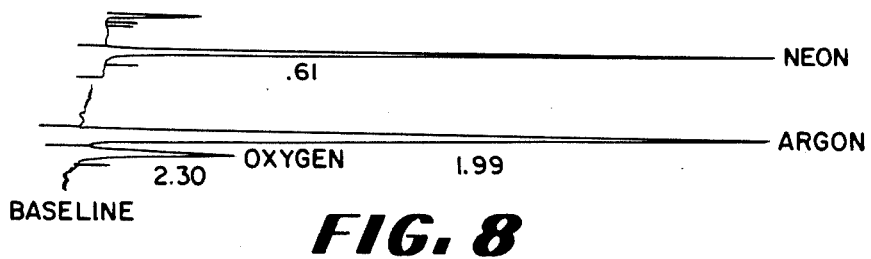
FIG. 8 is a chromatogram for the separation of argon and oxygen in Blend Gas #1 at 70° C. utilizing the adsorbent produced by the procedure in Example 34.
Figure 9:
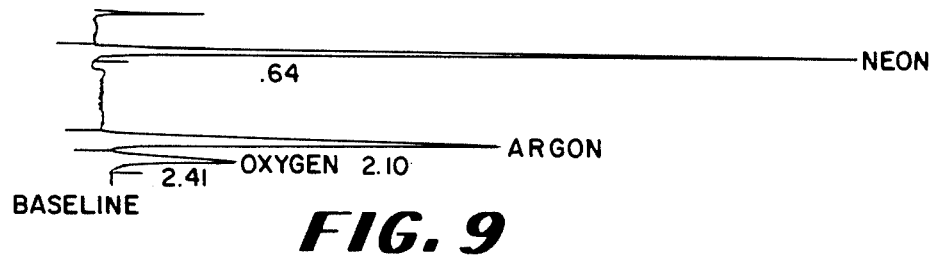
FIG. 9 is a chromatogram for the separation of argon and oxygen in Blend Gas #1 at 70° C. utilizing the adsorbent produced by the procedure in Example 9.

FIGS. 7 through 9 set out a comparison between the adsorbents prepared by Examples 2, 34, and 9, respectively, for Blend Gas #1 at 70° C. As can be seen from FIG. 8, the critical step which activates the adsorbent for argon oxygen separation is the oxidation procedure. The base zeolite is calcium exchanged chabazite.

Figure 10:
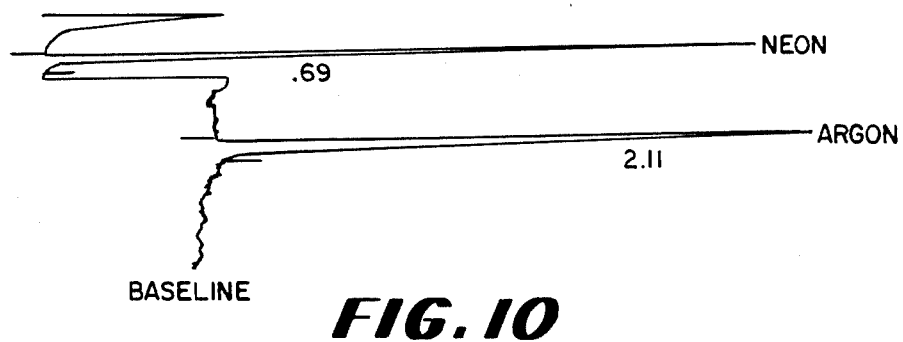
FIG. 10 is a chromatogram for the separation of argon and oxygen in Blend Gas #1 at 40° C. utilizing the adsorbent produced by the procedure in Example 17.
Figure 11:
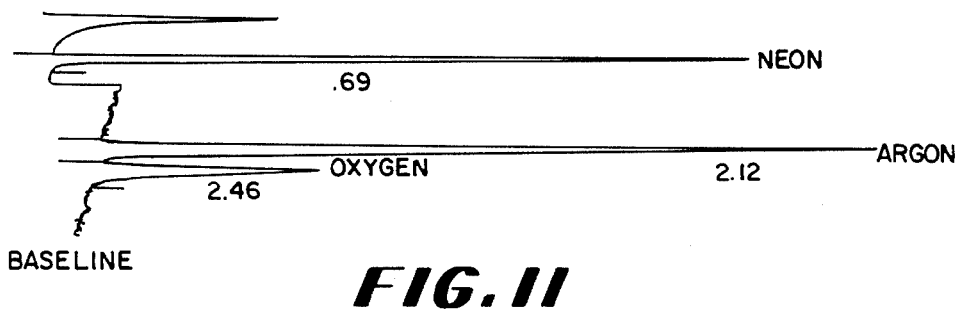
FIG. 11 is a chromatogram for the separation of argon and oxygen in Blend Gas #1 at 40° C. utilizing the adsorbent produced by the procedure in Example 18.

FIGS. 10 and 11 demonstrate the effect of the metal exchange of the base zeolite. FIG. 10 is the chromatogram of the adsorbent prepared by the method of Example 17 at 40° C. and using Blend Gas #1. FIG. 11 is the chromatogram utilizing the adsorbent of Example 18. The base zeolite is a magnesium-exchanged chabazite.

Figure 12:
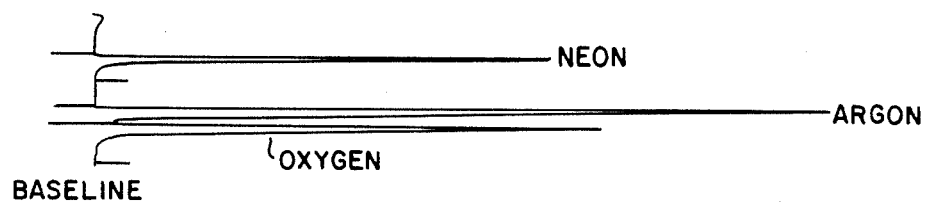
FIG. 12 is a chromatogram for the separation of argon and oxygen in Blend Gas #1 at 40° C. utilizing the adsorbent produced by the procedure in Example 20.

FIG. 12 shows that the invention can be successfully applied to polyvalent forms of other zeolites. Shown here are the results for a Ca-X adsorbent prepared by the procedure of Example 30.

Figure 13:
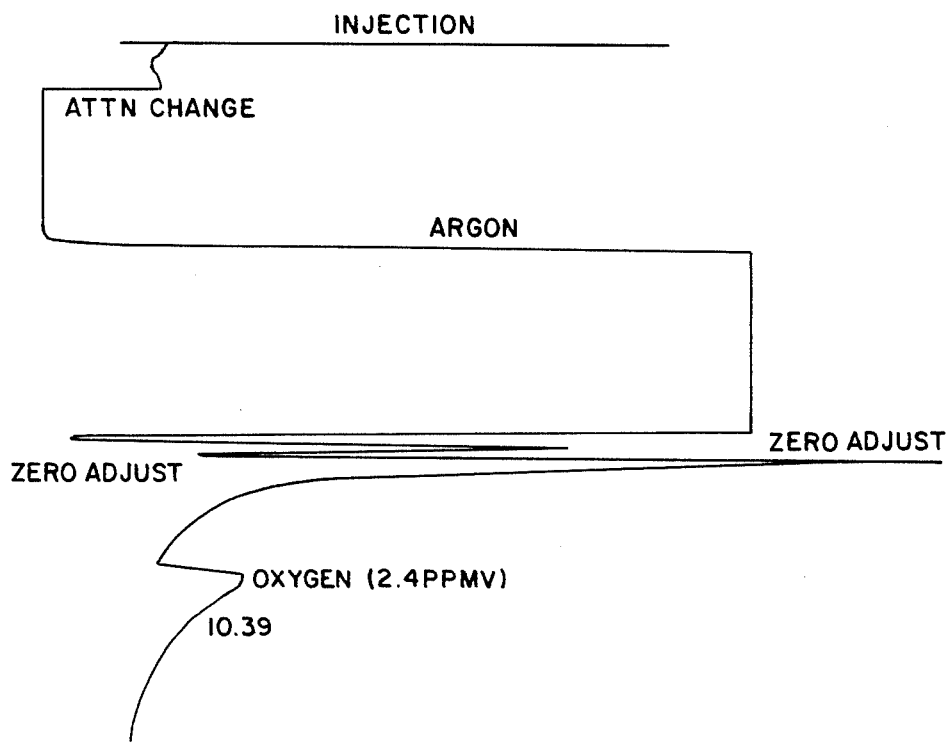
FIG. 13 is a chromatogram for the separation of argon and oxygen in Blend Gas #1 at 40° C. utilizing a crystalline chabazite subjected to the procedure of Example 9.

Finally, a crystalline chabazite from Nova Scotia having 77% of its exchange capacity in the calcium form was packed in a column and dehydrated according using a procedure similar to that described in Example 2 and then treated with zero air according to the procedure similar to Example 9. Gas chromatographic analysis using this material successfully analyzed trace amounts of oxygen in bulk argon. The chromatogram obtained from this analysis is shown in FIG. 13.

As can be seen from FIGS. 1-13, the mild oxidation of a thoroughly dehydrated, divalent metal exchanged, preferably, and alkaline earth metal exchanged, zeolite produces an adsorbent which is selective in its adsorption abilities and can readily separate low level concentration of argon and oxygen from a gas stream, in particular, a helium stream. In addition, this mild oxidation also enables the adsorbent to separate argon from oxygen, thereby providing a beneficial analytical technique.

The above gases provide typical examples. The use of the chromatographic materials of this invention would be applicable to separate or detect other permanent gases in bulk helium. Similar analyses for permanent gases should be possible in other bulk gas streams using the zeolitic adsorbents described by this invention.

Gaseous mixtures containing several permanent gases have been effectively separated using these adsorbents. Therefore, this adsorbent used as a chromatographic material provides a wide range of versatility allowing both difficult as well as more routine separations to be achieved with a single column over a very large range of concentrations.

Unique separations which can be achieved with the air activated Ca-chabazite include:
Trace Ar and $O_2$ in different matrices at 85° C.
Trace Ar from bulk $O_2$
Trace $O_2$ from bulk Ar
Trace Kr and Ar in different gas matrices at elevated temperature (115° C.)
Trace $N_2$ from bulk Ar
Trace Ar from bulk $H_2$
Trace $O_2$ from bulk $H_2$ According to the known laws of adsorption technology, any adsorbent can be used to affect the separation of a gaseous mixture in two ways: (1) using a carrier gas stream (such as GC analysis), or (2) by the principle of frontal analysis. Since we have shown that the polyvalent forms of chabazite effectively separate oxygen and nitrogen from argon it should be possible to remove oxygen and nitrogen from argon by the principle of frontal analysis. The efficiency of such a process will depend on a number of factors including the concentrations of the components to be removed, temperature of the process, and adsorption properties of the various gases on the particular adsorbent.

Due to the high heats of adsorption for nitrogen exhibited by the thoroughly dehydrated polyvalent forms of chabazite, they have sufficient nitrogen capacity to have practical utility for removing nitrogen impurities from argon. This is a direct consequence of the thermodynamic adsorption properties of these adsorbents. The calcium form of chabazite has a limiting nitrogen heat of adsorption of $-11.0$ kcal/mole and a nitrogen/argon selectivity of 15 at 30° C. The high values for these intrinsic properties are directly responsible for the increased capacity of these adsorbents for nitrogen in the presence of argon.

Even though these same adsorbents display the capability of separating oxygen from argon in a chromatographic application, both the gas capacity and oxygen-/argon selectivity are much too low to have practical utility for removing oxygen from argon. On the other hand, gases having significant quadropole moments or permanent dipole moments should have sufficiently high adsorption properties that they can be removed from other bulk gases possessing lower adsorption properties.

Surprisingly, it was found that when thoroughly dehydrated in the presence of a non-reactive atmosphere or under vacuum, the polyvalent form of chabazite, particularly calcium, have significantly higher intrinsic adsorption properties. These enhanced properties result in improved adsorbents for a variety of separations. The higher heat of adsorption gives rise to increased capacity in the low pressure region at a given set of process conditions. It has been found that thoroughly dehydrated calcium chabazite has an order of magnitude higher capacity for nitrogen in the low pressure region than other known adsorbents, and it has been demonstrated that these adsorbents are effective nitrogen scavengers. In general, the materials of this invention display improved properties for removing low levels of gas contaminants having larger heats of adsorption than the bulk component. Other gas purifications which should be possible include:
dilute CO from $H_2$
dilute $N_2$ from $H_2$
dilute $CH_4$ from $H_2$
dilute $CH_4$ from $N_2$
dilute $N_2$ from He
trace $N_2$ from Ar
trace $O_2$ from He
trace $O_2$ from $H_2$
trace $O_2$ from $N_2$ Also, the combination of the shape-selective properties of the medium pored chabazites and their increased heat of adsorption suggests that this class of adsorbents would be superior for removing nitrogen or other weakly interacting gases from bulk gases whose kinetic diameter exceeds that of the adsorbent's pore opening, i.e. $CF_4$ can be purified in this manner.

For the chabazites the method of reaching the final dehydration temperature does not appear critical. Activation of the calcium chabazite to a level of optimum performance can be carried out by any method which will remove all the water from the zeolite cavity including that surrounding the cations without causing structural collapse of the zeolite. To achieve this in a practical manner, a temperature of 400°-500° C. should be maintained while the adsorbent is purged with a brisk flow of a nonreactive gas. Alternatively, the adsorbent can be activated to similar temperatures under vacuum. Increasing the number of divalent cations accessible to nitrogen will improve the adsorption capacity. For purification, the higher the exchange level of the polyvalent cation the better. At the least a majority of the exchangeable ions should be in the divalent form.

The increased nitrogen capacity and higher nitrogen/argon selectivity for the chabazite described by this invention results in a superior nitrogen scavenger adsorbent. The data in Table VIII give the adsorption properties for several adsorbents which were thoroughly dehydrated by being activated to 400° C. for at least eight hours. For all the zeolites exchanging the sodium form or partially calcium exchanged form into the highly exchanged calcium form increases the nitrogen Henry constant and isosteric heat. The Henry constant determined from the GC screening provides a relative measure of the capacity in the linear (low pressure) region of the isotherm. The largest improvements occur when the calcium exchange level of chabazite is increased. Note that both the capacity and nitrogen/argon selectivity are twice as high for calcium chabazite compared to the adsorbents of the prior art (i.e. calcium mordenite). The table shows that typical adsorbents such as NaX or even the calcium form have much lower capacities and heats in the Henry region and would therefore be much less effective as nitrogen scavengers.

with a major correction for sites occupied by the bulk gas. The two equations are solved simultaneously to estimate the capacities of both gases at equilibrium. This model was verified as accurate at trace gas levels in experiments as described in Examples 44 and 45 below. The results of the experiments compared to predicted values were:

| Nitrogen Conc. (ppm) | Nitrogen Adsorption Capacities g nitrogen per 100 g adsorbent | | |
|---|---|---|---|
| | Experimental | Predicted | Error |
| 3.5 | 0.00261 | 0.00264 | 1.1% |
| 94.0 | 0.0700 | 0.0710 | 1.4% |
| 94.0 | 0.0773 | 0.0710 | −8.2% |

This model indicated that calcium chabazite has superior characteristics for the removal of trace nitrogen from argon than other zeolites, such as calcium mordenite. For example, the model's predicted nitrogen loadings for 10 ppm nitrogen in argon at 100 psig on calcium chabazite were twice those for a calcium mordenite.

| Temp. (C.) | Nitrogen Adsorption Capacities g nitrogen per 100 g adsorbent | | Ratio |
|---|---|---|---|
| | Ca Chab. | Ca—Mordenite | |
| 4.5 | 0.00158 | 0.00078 | 2.03 |
| 29.9 | 0.00044 | 0.00020 | 2.20 |

At lower temperatures, calcium chabazite should have even higher relative capacities due to its relatively high average heat of adsorption for nitrogen.

EXAMPLE 44

215 grams of calcium chabazite adssorbent were charged to a stainless steel bomb 5.25 cm in diameter. The material was activated by heating to 400° C. while

TABLE VIII

| Entry | Adsorbent | Major Cation Form(s) | Major Ion Exchange Level (%) | Nitrogen Henry Constants at 30° C. (mmoles/g atm) | Isosteric Heats (kcal/mole/K.°) | 1% $N_2$/Ar Selectivity at 30° C. (a) |
|---|---|---|---|---|---|---|
| 1 | Mordenite | Na | >95 | 1.04 | −6.6 | NA |
| 2 | Mordenite | Ca | 70 | 3.8 | −9.6 | 8.8 |
| 3 | Chabazite | Ca | 59 | 0.99 | −6.8 | 3.9 |
| 4 | Chabazite | Ca | 88 | 9.8 | −11.1 | 14.8 |
| 5 | NaX | Na | 99 | 0.25 | −4.7 | NA |
| 6 | CaX | Ca | 98 | 2.67 | −7.7 | NA |

(a) Determined by Ideal Solution Adsorption Theory* after isotherm data was fitted.
*A. L. Myers and J. M. Prausnitz, AIChE J. 11 121(1965)

The thermodynamic data alone is not sufficient to determine if the selectivity and capacity enhancements observed for calcium chabazite would provide a significant impact for a purification process. The following examples show the utility of calcium chabazite as a nitrogen scavenger and its superiority over the calcium mordenite of the prior art.

In order to screen adsorbents for use in removing trace nitrogen (<100 ppm) from argon an adsorption model was developed. The model combines single-component isotherm data to estimate dual-component adsorption equilibria. The equilibrium capacity of the bulk gas (argon) is estimated using the empirical equation which is a modification of the Langmuir isotherm to account for adsorbent heterogeneity. The equilibrium capacity for the trace gas is estimated using a Henry's law constant fitted to low-pressure adsorption data, passing a 0.5 SCFH helium purge stream through the bed. These conditions were maintained for 12 hours, at which time the bed was allowed to cool to room temperature.

The bed was then submerged in a dry ice/methylene chloride path at −78° C. A mixture of 94 ppm by volume nitrogen in dry argon (<0.15 ppm water) was passed through the bed at 15 SCFH and 100 psig. Outlet nitrogen concentrations were as follows:

| Elapsed Time (hrs) | Outlet Nitrogen Conc. (ppm) |
|---|---|
| 0.00 | ND (<1) |
| 0.22 | ND (<1) |
| 0.47 | ND (<1) |
| 0.72 | ND (<1) |
| 0.97 | ND (<1) |

-continued

| Elapsed Time (hrs) | Outlet Nitrogen Conc. (ppm) |
|---|---|
| 1.22 | ND (<1) |
| 1.47 | 1.00 |
| 1.72 | 2.00 |
| 1.97 | 4.50 |
| 2.22 | 8.00 |
| 2.47 | 11.75 |
| 2.72 | 19.00 |
| 2.97 | 25.00 |
| 3.22 | 31.50 |
| 3.47 | 38.50 |
| 3.72 | 45.00 |

ND = not detected

Based on these results, equilibrium capacity for the mixture was estimated at 0.077 g nitrogen per 100 g adsorbent in the presence of bulk argon. The mass transfer zone length was estimated as 20 cm.

EXAMPLE 45

The same experiment conducted in Example 44 was run identically, except that the feed gas contained only 3.5 ppm nitrogen in argon. Outlet nitrogen concentrations were as follows:

| Elapsed Time (hrs) | Outlet Nitrogen Conc. (ppm) |
|---|---|
| 0.00 | ND <1 |
| 0.17 | ND <1 |
| 0.25 | ND <1 |
| 0.50 | ND <1 |
| 0.75 | ND <1 |
| 1.00 | ND <1 |
| 1.25 | ND <1 |
| 1.50 | ND <1 |
| 1.75 | 1.00 |
| 2.00 | 1.00 |
| 2.25 | 1.00 |
| 2.50 | 1.00 |
| 2.75 | 1.00 |
| 3.00 | 1.25 |
| 3.25 | 1.50 |
| 3.50 | 1.50 |
| 3.75 | 1.75 |
| 4.00 | 2.00 |
| 4.25 | 2.75 |
| 4.50 | 2.75 |
| 4.75 | 2.75 |
| 5.00 | 2.75 |
| 5.25 | 3.00 |
| 5.50 | 3.25 |
| 5.75 | 3.50 |
| 6.00 | 3.50 |

Based on these results, equilibrium capacity for the mixture was estimated as 0.0026 g nitrogen per 100 g adsorbent in the presence of bulk argon. The mass transfer zone length was estimated as 22 cm.

EXAMPLE 46

The use of calcium chabazite for nitrogen removal from argon was demonstrated in the testing of a bench-scale purification system. This system contained three vessels to remove impurities from argon, the first containing a copper catalyst for oxygen removal, the second containing 13X molecular sieve for $H_2O$ and $CO_2$ removal, and the third containing calcium chabazite for nitrogen removal.

The calcium chabazite vessel was approximately 2 inches in diameter and contained 370 grams of material. The bed was regenerated as in Example 44 and then submerged in a dry ice/methylene chloride bath at $-78°$ C. 40 SCFH of argon containing 37.5 vppm nitrogen and 9.5 vppm oxygen were compressed to 70 psig and passed through the purification system. Outlet nitrogen concentrations from the chabazite bed were as follows:

| Elapsed Time (Hrs.) | Outlet nitrogen Concen. (ppmv) |
|---|---|
| 0 | ND <3 ppm |
| .30 | ND <3 ppm |
| .62 | ND <3 ppm |
| .93 | 6.5 |
| 1.2 | 16.0 |
| 1.5 | 18.0 |
| 1.9 | 23.0 |

Based on these results, the saturated bed capacity for the mixture was estimated as 0.02 g nitrogen per 100 g adsorbent. It should be noted that this nitrogen capacity may be lower than what could be ideally achieved since it is known that the feed gas to the chabazite bed did have at least 1 vppm moisture present due to an experimental problem.

The separation of nitrogen from $CF_4$ provides an example of how these chabazite adsorbents are superior for removing gas contaminants from bulk gases which are too large to enter the zeolitic cavity, even if the heat of adsorption of the bulk gas is similar to that of the impurity.

Table IX summarizes the results for a series of GC studies which demonstrate that calcium chabazite effectively excludes $CF_4$ and can be used to remove nitrogen and oxygen. Henry constants and isosteric heats determined by GC evaluation are given for nitrogen, oxygen, and $CF_4$. No studies were carried out with CO, but it is expected that it will be readily adsorbed on any of these adsorbents since it has a permanent dipole.

TABLE IX

| Entry | Adsorbent | Major Cation Form(s) | Henry Constants at 30° C. (mmoles/g atm) | | | Isosteric Heats (kcal/mole/°K.) | | |
|---|---|---|---|---|---|---|---|---|
| | | | $O_2$ | $N_2$ | $CF_4$ | $O_2$ | $N_2$ | $CF_4$ |
| 1 | NaA (4A) | Na | 0.030 | 0.17 | NA | −4.86 | −5.10 | NA |
| 2 | CaA (5A) | Na, Ca | 0.107 | 0.400 | 1.172 | −3.82 | −5.58 | −5.46 |
| 3 | NaX (13X) | Na | 0.084 | 0.245 | 0.918 | −3.49 | −4.74 | −5.302 |
| 4 | Chabazite | Na, Ca | 0.232 | 0.994 | 0.054 | −5.25 | −6.81 | −5.84* |
| 5 | Chabazite | Ca | 0.766 | 9.80 | 0.075 | −9.67 | −11.11 | −6.90* |
| 6 | Na Mordenite | Na | 0.305 | 2.18 | 0.0153 | −9.29 | −9.14 | −6.18* |
| 7 | Ca Mordenite | Ca | 0.411 | 3.78 | 0.007 | −9.62 | −9.56 | −6.78* |

*$CF_4$ Henry constant indicates minimal adsorption; this minimal adsorption is most likely on the surface and not in micropores.
NA - not adsorbed Sodium A zeolite is a small pore zeolite which totally excludes $CF_4$. (The retention time for $CF_4$ is less than that for the inert Ne used to obtain dead volume for the column.) The nitrogen and particularly oxygen capacity (indicated by the Henry constants) on this adsorbent are impracticably low. Ca exchange of NaA results in a larger pore zeolite which adsorbs $CF_4$ readily and has a $CF_4$ capacity 3 times that for nitrogen and 12 times that for oxygen, therefore it is totally ineffective for $CF_4$ cleanup. Sodium X is a large pore faujasite in which $CF_4$ has over three times the capacity of nitrogen and also would be ineffective for a $CF_4$ purification process. It is reasonable to expect that any ion form of X or A zeolite would be inappropriate to use for this application.

Table IX shows the large improvement in capacities that are achieved for oxygen and nitrogen in the low pressure region by using a chabazite molecular sieve; the chabazite has twice the oxygen and nitrogen capacity as CaA and essentially excludes $CF_4$. The small Henry constants (K<0.1) for $CF_4$ are inconsistent with the $\Delta H$ values and are most likely due to strong surface adsorption of a small quantity of $CF_4$. It is noteworthy that while nitrogen and $CF_4$ have comparable heats of adsorption on chabazite, the Henry constant is much smaller for $CF_4$. This strongly suggests that $CF_4$ is largely excluded from the zeolite micropores but adsorbs to a negligible extent on the external surface of the crystals.

The calcium exchanged form of Linde chabazite results in an additional ten-fold increase in the nitrogen capacity at the pressures of interest. The large rise in isosteric heats for nitrogen and oxygen is consistent with the observed increases in capacity.

Mordenites in the sodium and calcium form were also evaluated. They exclude $CF_4$ and are substantially better than A or X type but inferior to the chabazites.

The above results indicate that calcium chabazite should provide the most effective adsorbent for removing nitrogen and oxygen from $CF_4$. Lowering the operating temperature should result in further improvements and increase the nitrogen capacity significantly.

EXAMPLE 47

A vessel was charged with 228 g of calcium chabazite adsorbent. The material was then activated and cooled as described in Example 44. A feed gas containing 570 ppm nitrogen in $CF_4$ was passed through the bed at 6.15 SCFH. Outlet nitrogen concentrations were as follows:

| Elapsed Time (hrs) | Outlet Nitrogen Conc. (ppm) |
|---|---|
| 0.00 | ND <17 |
| 1.03 | ND <17 |
| 2.00 | ND <17 |
| 2.50 | ND <17 |
| 3.00 | ND <17 |
| 3.50 | ND <17 |
| 4.00 | ND <17 |
| 4.50 | ND <17 |
| 5.03 | 20 |
| 5.55 | 28 |
| 6.07 | 45 |
| 6.58 | 72 |
| 7.10 | 92 |
| 7.62 | 132 |
| 8.13 | 173 |
| 8.65 | 223 |
| 9.17 | 289 |
| 9.68 | 358 |
| 10.20 | 432 |
| 10.72 | 489 |
| 11.23 | 546 |
| 11.75 | 572 |

Based on these results, equilibrium capacity for the mixture was estimated a 0.40 g nitrogen per 100 g adsorbent. The same experiment run with Linde AW-500 Na/Ca chabazite (non-exchanged) showed a capacity of 0.13 g nitrogen per 100 g adsorbent. The higher overall capacities, as compared to the nitrogen/argon system, are due to the non-competitive nature of the nitrogen/$CF_4$ separation, i.e. $CF_4$ does not enter the zeolite.

EXAMPLE 48

The same experiment conducted in Example 47 was run identically, except that the feed gas contained 4600 ppm nitrogen in $CF_4$. Outlet nitrogen concentrations were as follows:

| Elapsed Time (hrs) | Outlet Nitrogen Conc. (ppm) |
|---|---|
| 0.00 | ND <17 |
| 0.52 | ND <17 |
| 1.03 | ND <17 |
| 1.55 | 263 |
| 2.07 | 1280 |
| 2.58 | 1372 |
| 3.10 | 5066 |
| 3.62 | 3521 |
| 4.13 | 5143 |
| 4.65 | 4384 |

Based on these results, equilibrium capacity for the mixture was estimated as 1.17 g nitrogen per 100 g adsorbent. The same experiment run with Linde AW-500 Na/Ca chabazite (non-exchanged) showed a capacity of 0.54 g nitrogen per 100 g adsorbent.

Figure 14:
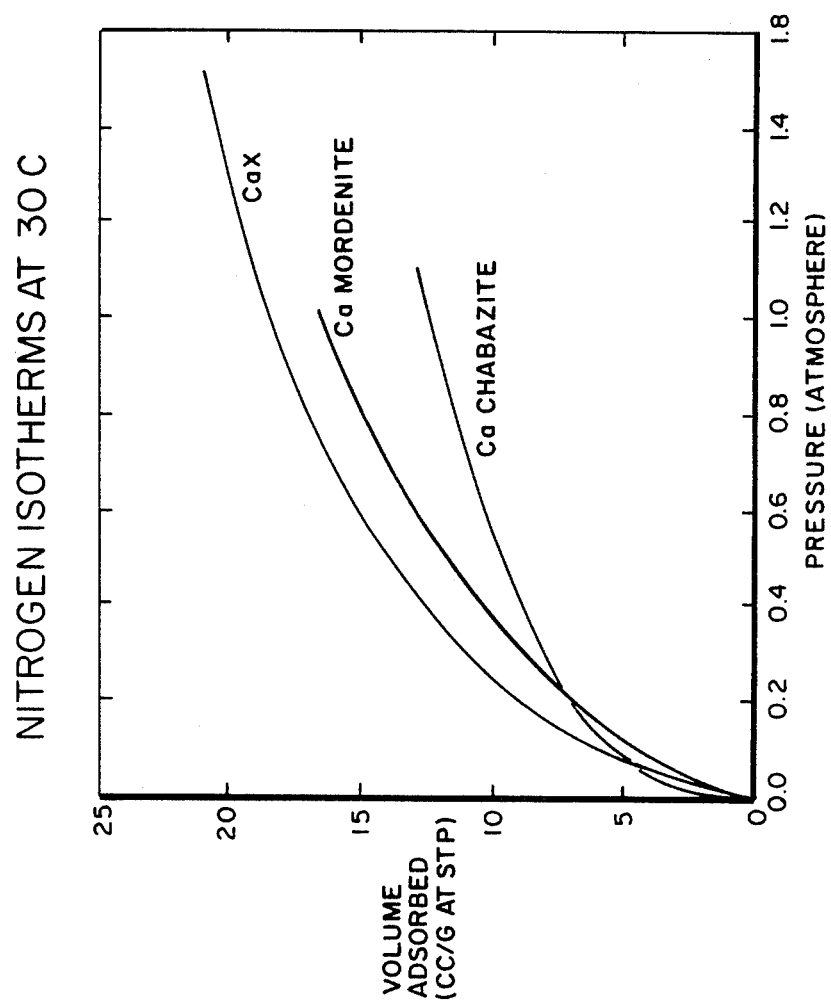
FIG. 14 is a diagram of the nitrogen isotherms at 30° C. for the calcium forms of chabazite, X zeolite, and mordenite.
Figure 15:
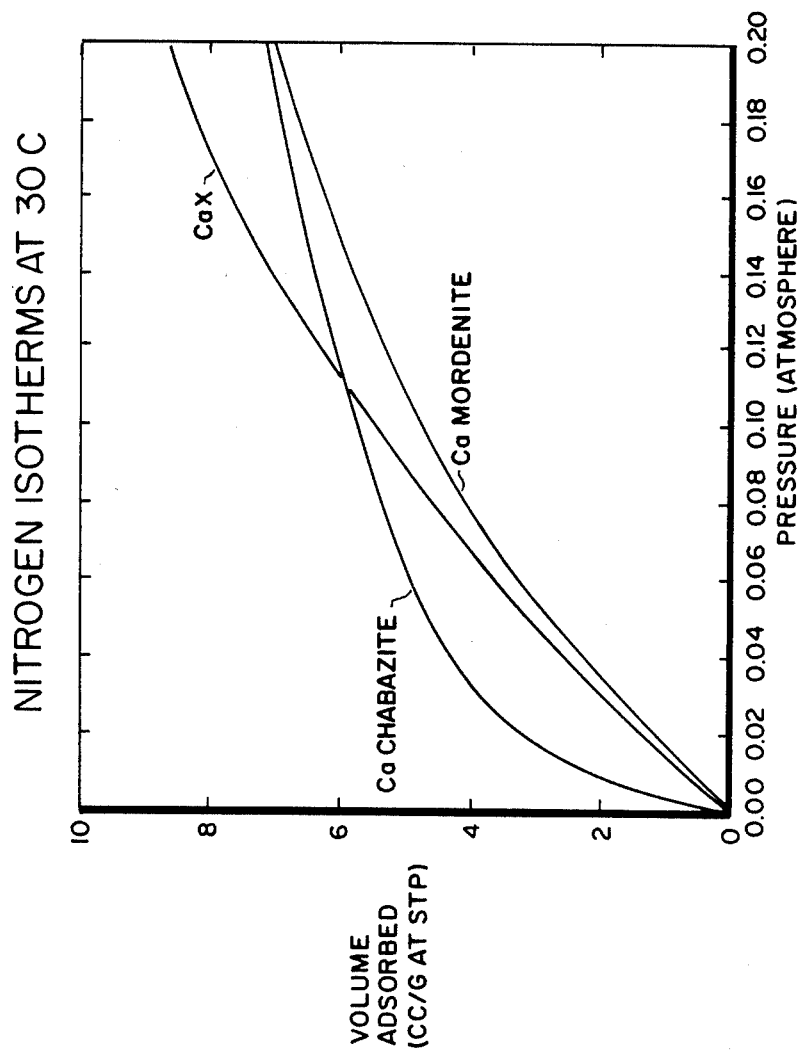
FIG. 15 is a diagram of the low pressure regime nitrogen isotherms at 30° C. for the calcium forms of chabazite, X zeolite, and mordenite.

As a graphical representation of the findings from the above examples, FIG. 14 presents the nitrogen isotherms at 30° C. for the calcium forms of chabazite, X zeolite, and mordenite. The high nitrogen heat of adsorption for Ca Chabazite is reflected in the isotherm shape. Note that at ambient pressures (around one atmosphere) both CaX and Ca Mordenite have higher nitrogen capacities compared to Ca chabazite. However, at pressures below 0.02 atmosphere (the region of interest for removing ppm levels of nitrogen contaminant) the Ca chabazite has significantly greater nitrogen capacity, see FIG. 15.

FIG. 16 shows the nitrogen and argon isotherms at 30° C. for Ca chabazite and clearly shows the large selectivity for nitrogen over argon at these conditions.

The present invention has been described with reference to several preferred embodiments thereof. However, these embodiments should not be considered a limitation on the scope of the invention, which scope should be ascertained by the following claims.

We claim:

1. A method for activation of a zeolitic composition for use as a selective chromatographic adsorbent, wherein said zeolitic composition has at least a portion of any exchangeable ion capacity exchanged with a metal cation having a charge density of about 2.0 or greater, which comprises the steps of:
   (a) heating said exchanged, zeolitic composition in a nonreactive atmosphere or under a vacuum for a period of time sufficient to thoroughly dehydrate said exchanged, zeolitic composition; and
   (b) reacting said heat treated, exchanged, zeolitic composition with an oxidizing atmosphere.

2. The method of claim 1 wherein at least 50% of any exchangeable ion capacity are exchanged with a metal cation having a charge density of about 2.0 or greater.

3. The method of claim 1 wherein said metal cation is a divalent metal.

4. The method according to claim 1 wherein said zeolitic composition is selected from the group consisting of chabazite, mordenite, A zeolite, X zeolite and mixtures thereof.

5. The method of claim 4 wherein said zeolitic composition is chabazite.

6. The method according to claim 3 wherein said divalent metal is an alkaline earth metal.

7. The method of claim 6 wherein said alkaline earth metal is calcium.

8. The method of claim 1 wherein said metal cation is lithium.

9. The method of claim 1 wherein said zeolite is chabazite and said metal cation is calcium.

10. The method of claim 1 wherein said heat step comprises gradually heating said zeolitic composition from ambient temperature to about 400° C. and heat soaking said zeolitic composition at temperature for a period of time sufficient to thoroughly dehydrate said exchanged, zeolitic composition.

11. The method of claim 10 wherein said gradual heating is at a temperature increase in the range of 0.5° to 25° C./min.

12. The method of claim 10 wherein said gradual heating is at a temperature increase in the range of 3° to 12 ° C./min.

13. The method of claim 10 wherein said heat soaking is for a period of not less than eight hours.

14. The method of claim 1 wherein said nonreactive atmosphere is selected from the group consisting of helium, nitrogen, argon, hydrogen, $CF_4$, fluorinated hydrocarbons, zero air and mixtures thereof.

15. The method of claim 1 wherein said reacting comprises gradually heating said exchanged heat treated zeolitic composition from ambient temperature to about 250° C. and heat soaking said zeolite composition at temperature.

16. The method of claim 15 wherein said gradual heating is at a rate in the range of 2° to 10° C. per minute.

17. The method of claim 15 wherein said heat soaking is for a period of not less than 1.5 hours.

18. The method of claim 1 wherein said oxidizing atmosphere is zero air.

19. The method of claim 1 wherein said oxidizing atmosphere is $N_2O$.

20. A method for activation of a zeolitic composition for use as a selective chromatographic adsorbent, wherein said zeolitic composition has at least a portion of any exchangeable ion capacity exchanged with a metal cation having a charge density of about 2.0 or greater, which comprises heating said exchanged zeolitic composition in a nonreactive oxidizing atmosphere from ambient temperature to about 400° C. and heat soaking at that temperature said exchanged zeolitic composition for a period of time sufficient to throughly dehydrate and react in an oxidizing atmosphere the zeolitic composition.

21. The method of claim 20 wherein at least 50% of any exchangeable ion capacity are exchanged with a metal cation having a charge density of about 2.0 or greater.

22. The method of claim 20 wherein said metal cation is selected from the group consisting of calcium, magnesium, lithium and mixtures thereof.

23. The method according to claim 20 wherein said zeoltic composition is selected from the group consisting of chabazite, mordenite, A zeolite, X zeolite and mixtures thereof.

24. The method of claim 23 wherein said zeolitic composition is chabazite.

25. A selective chromatographic adsorbent produced by activation of a zeolitic composition, wherein said zeolitic composition has at least a portion of any exchangeable ion capacity exchanged with a metal cation having a charge density of about 2.0 or greater, said activation comprising the steps of:
(a) heating said exchanged, zeolitic composition in a nonreactive atmosphere or under a vacuum for a period of time sufficient to thoroughly dehydrate said exchanged, zeolitic composition; and
(b) reacting said heat treated, exchanged, zeolitic composition with an oxidizing atmosphere.

26. A selective chromatographic adsorbent produced by activation of a zeolitic composition, wherein said zeolitic composition has at least a portion of any exchangeable ion capacity exchanged with a metal cation having a charge density of about 2.0 or greater, said activation comprising heating said exchanged zeolitic composition in a nonreactive oxidizing atmosphere from ambient temperature to about 400° C. and heat soaking at that temperature said exchanged zeolitic composition for a period of time sufficient to thoroughly dehydrate and react in an oxidizing atmosphere the zeolitic composition.

* * * * *